(12) United States Patent
Ono

(10) Patent No.: US 7,200,261 B2
(45) Date of Patent: Apr. 3, 2007

(54) PARALLAX IMAGE CAPTURING APPARATUS AND PARALLAX IMAGE PROCESSING APPARATUS

(75) Inventor: Shuji Ono, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 585 days.

(21) Appl. No.: 09/934,573

(22) Filed: Aug. 23, 2001

(65) Prior Publication Data

US 2002/0028014 A1    Mar. 7, 2002

(30) Foreign Application Priority Data

Aug. 25, 2000 (JP) ............................. 2000-256432

(51) Int. Cl.
*G06K 9/00* (2006.01)
*G01C 3/14* (2006.01)
*G02B 27/22* (2006.01)
*G06T 15/00* (2006.01)
*H04N 15/00* (2006.01)

(52) U.S. Cl. .................. 382/154; 382/106; 356/12; 348/50; 345/419; 359/462

(58) Field of Classification Search ............... 382/106, 382/154; 348/42–55; 396/323–340
See application file for complete search history.

(56) References Cited

U.S. PATENT DOCUMENTS 3,800,307 A * 3/1974 Wechsler ................. 396/330
5,835,133 A * 11/1998 Moreton et al. ............. 348/49
5,852,672 A * 12/1998 Lu .............................. 382/154
6,031,538 A   2/2000 Chupeau et al.
6,067,115 A * 5/2000 Suda .......................... 348/350
6,269,223 B1 * 7/2001 Lo et al. ..................... 396/322
6,288,385 B1 * 9/2001 Miramonti et al. ...... 250/208.1
6,324,347 B1 * 11/2001 Bacs et al. .................. 396/429
6,445,815 B1 * 9/2002 Sato .......................... 382/154
6,747,610 B1 * 6/2004 Taima et al. .................. 345/6

FOREIGN PATENT DOCUMENTS

EP   0 915 433 A2   5/1999
JP   2611173        6/1994
WO   WO 95/12954 A  5/1995

OTHER PUBLICATIONS

"Sliding Aperture Multiview 3-D Camera-Projector System and Its Application for 3-D Image Transmission and IR to Visible Conversion" Proceedings of the SPIE, SPIE, Bellingham, VA, US vol. 3012, Feb. 11, 1997 pp. 96-106.

* cited by examiner

Primary Examiner—Jingge Wu
Assistant Examiner—Charles Kim
(74) Attorney, Agent, or Firm—Birch, Stewart, Kolasch & Birch, LLP

(57) ABSTRACT

An image capturing apparatus for obtaining information regarding a depth of a subject, includes: a capturing section for performing image capturing for the subject at a plurality of viewpoints; and a controller for controlling the capturing section to successively perform the image capturing at the plurality of viewpoints, wherein the controller controls the capturing section to perform the image capturing for the subject two or more times at least one of the viewpoints.

16 Claims, 17 Drawing Sheets

IMAGE L1: NOSE

IMAGE L3: NOSE

ESTIMATED IMAGE L2: NOSE

ESTIMAGED IMAGE GROUP

ESTIMATED IMAGE R2: NOSE

PARALLAX IMAGE CAPTURING APPARATUS AND PARALLAX IMAGE PROCESSING APPARATUS

This patent application claims a priority on a Japanese patent application, 2000-256432 filed on Aug. 25, 2000, the contents of which are incorporated herein by reference.

BACKGROUND OF THE INVENTION

1. Field of the Invention

The present invention relates to an image capturing apparatus, an image processing apparatus, an image capturing method, a recording medium and a program for obtaining information regarding a depth of a subject. More particularly, the present invention relates to an image capturing apparatus, an image processing apparatus, an image capturing method, a recording method and a program for obtaining the information regarding the depth of the subject based on parallax images of the subject.

2. Description of the Related Art

In order to obtain information regarding a position of a subject to be shot, a stereo-image capturing technique has been known for a long time in which parallax images in a case where the subject is viewed from two different viewpoints are taken by two cameras arranged side by side to achieve binocular vision of a human, so as to measure the depth of the subject. From the difference of the positions of the viewpoints, the difference of the position of an image of the subject between the taken parallax images is detected. Then, based on the thus detected positional difference of the image of the subject and a focal length of a lens of each camera, a distance from the camera to the subject is obtained by triangulation. Moreover, Japanese Patent No. 2611173 (issued on Feb. 27, 1997) discloses a method in which the position of a moving object is measured by using at least three capturing devices.

This method, however, has a disadvantage that the size of an entire apparatus becomes large and therefore the processing cost required for the measurement also increases, since this method needs at least three capturing devices for the image capturing.

SUMMARY OF THE INVENTION

Therefore, it is an object of the present invention to provide an image capturing apparatus, an image processing apparatus, an image capturing method, a recording medium and a program for obtaining information regarding a depth of a moving subject by a simple arrangement of the apparatus, which are capable of overcoming the above drawbacks accompanying the conventional art. The above and other objects can be achieved by combinations described in the independent claims. The dependent claims define further advantageous and exemplary combinations of the present invention.

According to the first aspect of the present invention, an image capturing apparatus for obtaining information regarding a depth of a subject, comprises: a capturing section operable to perform image capturing for the subject at a plurality of viewpoints; and a controller operable to control the capturing section to successively perform the image capturing at the plurality of viewpoints, wherein the controller controls the capturing section to perform the image capturing for the subject two or more times at least one of the plurality of viewpoints.

The capturing section may include a plurality of capturing units respectively provided at a plurality of different positions; and the controller may control the plurality of capturing units to successively perform the image capturing for the subject in such a manner that at least one of the capturing units performs the image capturing two or more times.

The image capturing apparatus may further comprise a viewpoint moving unit operable to move a position at which the capturing section performs the image capturing for the subject to the plurality of viewpoints, wherein the controller controls the capturing section to perform the image capturing for the subject at the plurality of viewpoints successively by moving the position to the plurality of viewpoints, thereby allowing the image capturing to be performed at the at least one viewpoint two or more times.

The image capturing apparatus may further comprise a depth calculating unit operable to calculate a depth of a particular region of the subject based on two or more images obtained by the image capturing performed for the subject two or more times at the one viewpoint and another image obtained by the image capturing performed at another viewpoint different from the one viewpoint.

The image capturing apparatus may further comprise a positional difference detecting unit operable to detect a positional difference of an image of the particular region of the subject based on the two or more images obtained at the one viewpoint and the other image obtained at the other viewpoint, wherein the depth calculating unit calculates the depth of the particular region of the subject based on the positional difference.

The image capturing apparatus may further comprise an estimated image generating unit operable to generate an estimated image of the particular region of the subject that is assumed to be captured at the one viewpoint at the same time as a time at which the other image was captured at the other viewpoint, by estimation based on the two or more image obtained at the one viewpoint, wherein the positional difference detecting unit detects a difference of a position of an image of the particular region of the subject between the estimated image and the other image obtained at the other viewpoint.

The image capturing apparatus may further comprise a time setting unit operable to set a time of the image capturing by the capturing section, wherein the estimated image generating unit estimates the position of the image of the particular region of the subject at a predetermined time at the one viewpoint, based on respective times at which the image capturing was performed two or more times at the one viewpoint and the position of the image of the particular region in the two ore more images obtained at the one viewpoint.

The capturing section may include a light converging unit operable to converge light incident thereon and a light-limiting unit having at least one aperture for limiting a range where the light is allowed to pass; and the viewpoint moving unit may move the aperture by moving the light-limiting unit, to realize the plurality of viewpoints. Alternatively, the capturing section may include a light converging unit operable to converge light incident thereon and a light-limiting unit having a plurality of apertures for limiting a range where the light is allowed to pass; and the viewpoint moving unit may close at least one of the plurality of apertures to realize the plurality of viewpoints.

The viewpoint moving unit may be capable of moving said capturing section at three or more viewpoints which are not aligned on one line. The capturing section may include the plurality of capturing units at three or more viewpoints which are not aligned on one line.

The viewpoint moving unit may be capable of moving the capturing section to five positions including apices and a center of a diamond.

The capturing section may include the plurality of capturing units at least five positions including apices and a center of a diamond.

The capturing section may perform the image capturing for the subject at two of the plurality of viewpoints; and the controller may control the capturing section to alternately perform the image capturing at the two viewpoints three or more times.

According to the second aspect of the present invention, an image processing apparatus for obtaining information regarding a depth of a subject, comprises: an inputting unit operable to input a plurality of images of the subject successively shot at a plurality of different viewpoints, the plurality of images including two or more images shot at one viewpoints; an estimated image generating unit operable to generate an estimated image that is assumed to be shot at the one viewpoint at a time the same as a time at which another one of the plurality of images was shot at another viewpoint different from the one viewpoint, by estimation based on the two or more images shot at the one viewpoint; a positional difference detecting unit operable to detect a difference of a position of an image of a particular region of the subject between the estimated image and the other image shot at the other viewpoint; and a depth calculating unit operable to calculate a depth of the particular region of the subject based on the difference of the position.

The estimation image generating unit may estimate the position of the image of the particular region of the subject when the subject is seen from the one viewpoint at the same time as the time at which the other image was captured at the other viewpoint, based on respective times at which the two or more images were shot at the one viewpoint and the position of the image of the particular region in the two or more images shot at the one viewpoint.

The estimated image generating unit may estimate the position of the image of the particular region of the subject when the subject is seen from the other viewpoint at the same time as the time at which the other image was captured at the other viewpoint, based on the position and a size of the image of the particular region in each of the two or more images shot at the one viewpoints.

The estimated image generating unit may separate a first region including a change of a position or size of an image of the subject between the two or more images shot at the one viewpoint from a second region including no change of the position or size of the image of the subject, and may use one of the two or more images shot at the one viewpoint as the estimated image in a case of generating the estimated image for the second region.

The inputting unit may alternately input a plurality of images shot at two of the plurality of viewpoints, the two viewpoints being different from each other; the estimated image generating unit may perform a first estimation using a first image shot at one of the two viewpoints and a second image shot at the one of the two viewpoints prior to the first image, and then performs a second estimation using a third image shot at the one of the two viewpoints after the first image and the first image; and the positional difference detecting unit may detect the positional difference between the first and second estimations by using the first image and a further image shot at the other of the two viewpoints.

According to the third aspect of the present invention, an image capturing method for obtaining information regarding a depth of a subject, comprises: capturing a first image of the subject at a first time at a first viewpoint; capturing a second image of the subject at a second time at a second viewpoint; capturing a third image of the subject at a third time at the first viewpoint; estimating an image of a particular region of the subject at the second time at the first viewpoint based on the first and third images; detecting a positional difference between the estimated image of the particular region of the subject and an image of the particular region of the subject in the second image; and calculating a depth of the particular region of the subject based on the detected positional difference.

According to the fourth aspect of the present invention, a recording medium storing a computer program for obtaining information regarding a depth of a subject is provided. The program comprises: an inputting module operable to input a plurality of images of the subject successively shot at a plurality of different viewpoints, the plurality of images including two or more images shot at one viewpoints; an estimated image generating module operable to generate an estimated image that is assumed to be shot at the one viewpoint at the same time as a time at which another one of the plurality of images was shot at another viewpoint different from the one viewpoint, by estimation based on the two or more images shot at the one viewpoint; a positional difference detecting module operable to detect a difference of a position of an image of a particular region of the subject between the estimated image and the other image shot at the other viewpoint; and a depth calculating module operable to calculate a depth of the particular region of the subject based on the difference of the position.

According to the fifth aspect of the present invention, a computer program for obtaining information regarding a depth of a subject, comprises: an inputting module operable to input a plurality of images of the subject successively shot at a plurality of different viewpoints, the plurality of images including two or more images shot at one viewpoints; an estimated image generating module operable to generate an estimated image that is assumed to be shot at the one viewpoint at the same time as a time at which another one of the plurality of images was shot at another viewpoint different from the one viewpoint, by estimation based on the two or more images shot at the one viewpoint; a positional difference detecting module operable to detect a difference of a position of an image of a particular region of the subject between the estimated image and the other image shot at the other viewpoint; and a depth calculating module operable to calculate a depth of the particular region of the subject based on the difference of the position.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

(Embodiment 1)

Figure 1:
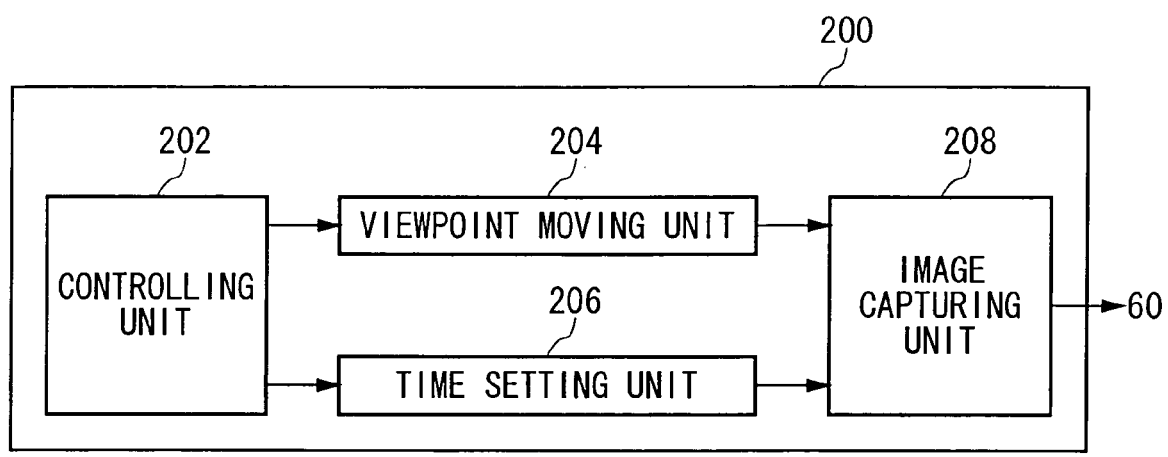
FIG. 1 is a functional block diagram of an image capturing apparatus according to the present invention.

The first embodiment of the present invention is described. FIG. 1 is a functional block diagram of an image capturing apparatus 200 of the present embodiment. The image capturing apparatus 200 includes a controlling unit 202, a viewpoint moving unit 204, a time setting unit 206, and an image capturing unit 208. The controlling unit 202, the viewpoint moving unit 204, the time setting unit 206, the image capturing unit 208 may be implemented by a capturing system CPU 50, a lens driver 42, a shutter driver 48, an image capturing unit 20 in a digital camera 10. The digital camera 10 is described in detail in the following description.

Figure 2:
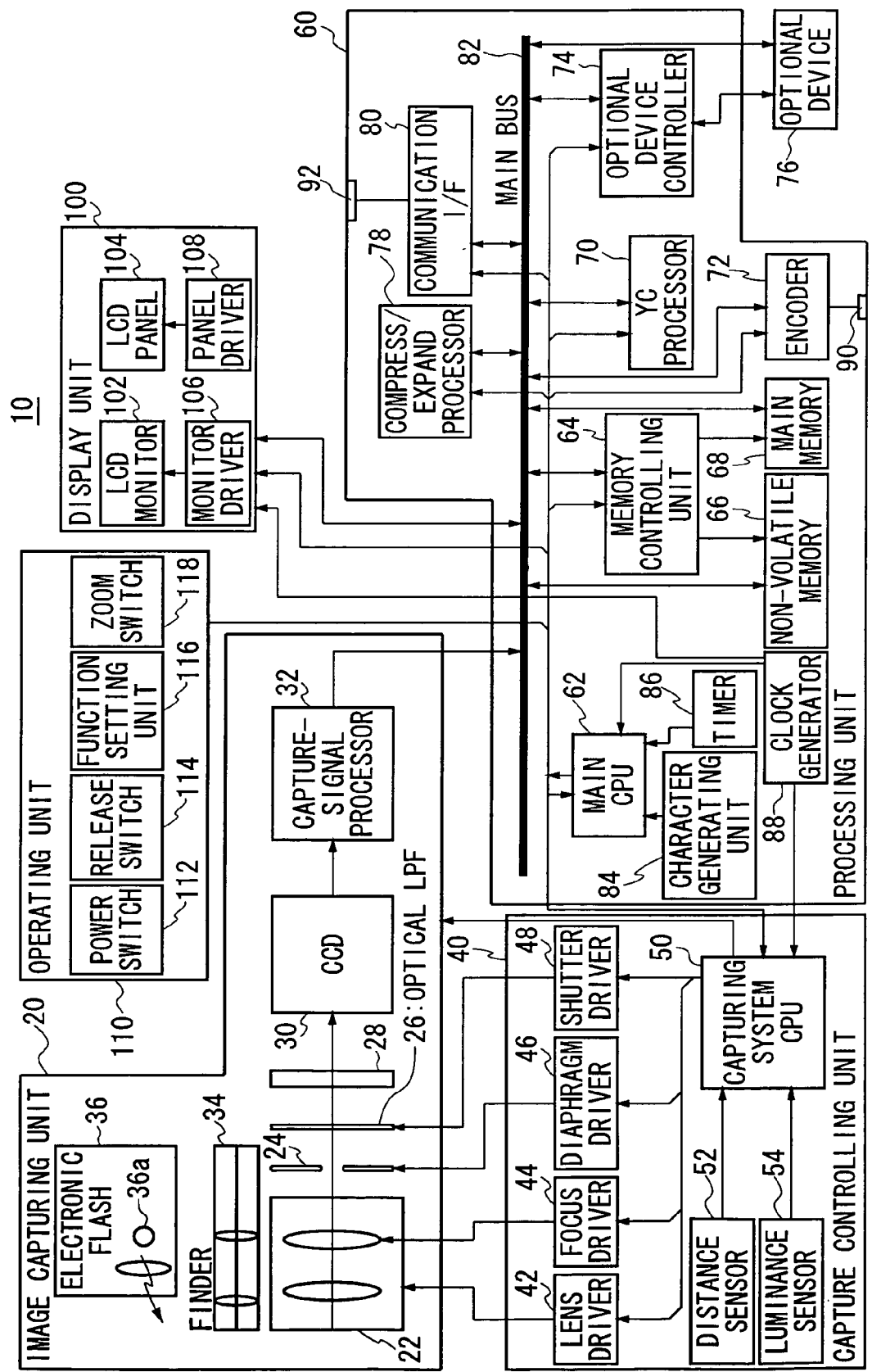
FIG. 2 is a block diagram of a digital camera as an example of the image capturing apparatus according to the present invention.

FIG. 2 is a block diagram of the digital camera 10 as an example of an image capturing apparatus. The term "digital camera" in the present application includes a digital still camera, a digital video recorder that can capture a still image of an object and the like. The digital camera 10 mainly includes an image capturing unit 20, a capture controlling unit 40, a processing unit 60, a display unit 100 and an operating unit 110.

The image capturing unit 20 includes mechanical members and electric members related to image capturing and image formation. The image capturing unit 20 includes a lens section 22, a diaphragm 24, a shutter 26 an optical LPF (low-pass filter) 28, a CCD 30 as an example of a solid-state image sensor and a capture-signal processor 32. The lens section 22 includes a focus lens, a zoom lens and the like.

This structure allows an image of a subject to be formed on a light receiving surface of the CCD 30. In accordance with the light amount of the formed image of the subject, respective sensor elements (not shown) of the CCD 30 are electrically charged. (Hereinafter, the electric charges stored in the sensor element are referred to as stored electric charged.) The stored electric charges are read by a read-gate pulse into a shift register (not shown), and are then read out as a voltage signal by a register transfer pulse successively.

The digital camera 10 generally has an electronic shutter function. Therefore, it is not necessary for the digital camera to include a mechanical shutter such as the shutter 26. In order to realize the electronic shutter function, the CCD 30 is provided with a shutter drain via a shutter gate. When the shutter gate is driven, the stored electric charges are drained out to the shutter drain. By controlling the shutter gate, a time period during which the respective sensor elements are electrically charged, that is, a shutter speed can be controlled.

The voltage signal output from the CCD 30, that is an analog signal, is subjected to color separation for separating the signal into R, G and B components in the capture-signal processor 32, thereby white balance is adjusted. Next, the capture-signal processor 32 performs gamma correction. Then, the R, G and B signals are successively subjected to A/D conversion at necessary times. Digital image data obtained by the above operations (hereinafter, simply referred to as "digital image data") is output to the processing unit 60.

The image capturing unit 20 further includes a finder 34 and an electronic flash 36. The finder 34 may includes an LCD (not shown) therein. In this case, various types of information from a main CPU 62 and the like can be displayed within the finder 34. The electronic flash 36 works by emission of light by a discharge tube 36a when an energy stored in a condenser (not shown) is supplied to the discharge tube 36a.

The capture controlling unit 40 includes a lens driver 42, a focus driver 44, a diaphragm driver 46, a shutter driver 48, a capturing system CPU 50 for controlling these drivers, a distance sensor 52 and a luminance sensor 54. Each of the drivers 42, 44, 46 and 48 has a driving means such as a stepping motor. When a release switch 114 described later is pressed down, the distance sensor 52 measures a distance to the subject while the luminance sensor 54 measures a luminance of the subject. The measured data of the distance (hereinafter, simply referred to as "distance data") and the measured data of the luminance (hereinafter, simply referred to as "luminance data") are sent to the capturing system CPU 50. The capturing system CPU 50 performs adjustments of a magnifying power and a focus of the lens section 22 by controlling the lens driver 42 and the focus driver 44 based on capturing information such as magnification specified by the user. Moreover, the capturing system CPU 50 controls the lens driver 42 to move the position of the lens section 22 in order to capture the parallax images.

The capturing system CPU 50 determines the F-number and the shutter speed based on an added value of the R, G and B digital signals of one image frame, that is, AE information, and then determines a time at which the shutter is to be driven. In accordance with the determination results, the diaphragm driver 46 adjusts the aperture size of the diaphragm and the shutter driver 48 performs opening/closing the shutter 26.

Moreover, the capturing system CPU 50 controls the light emission by the electronic flash 36 based on the luminance data and also adjusts the aperture size of the diaphragm 26.

When the user instructs the digital camera 10 to capture an image, the CCD 30 starts to be electrically charged. After the shutter time period calculated from the luminance data has passed, the stored electric charges are output to the capture-signal processor 32.

The processing unit 60 includes a main CPU 62 for controlling the entire digital camera 10, especially the processing unit 60, a memory controlling unit 64, a YC processor 70, an optional device controller 74, a compress/expand processor 78, and a communication interface (I/F) 80 all of that are controlled by the main CPU 62. The main CPU 62 communicates with the capturing system CPU 50 by serial communication or the like. An operation clock of the main CPU 62 is supplied from a clock generator 88 that also supplies clocks having different frequencies to the capturing system CPU 50 and the display unit 100, respectively.

In addition to the main CPU 62, a character generating unit 84 and a timer 86 are provided in the processing unit 60. The timer 86 has the backing of a battery cell so that the timer 86 always counts the time and date. Based on the counted values, information regarding the capturing date and other information related to the time are sent to the main CPU 62. The character generating unit 84 generates character information such as the capturing date, a title of the captured image or the like. The thus generated character information is appropriately combined with the captured image.

The memory controlling unit 64 controls a non-volatile memory 66 and a main memory 68. The non-volatile memory 66 includes an EEPROM (electrically erasable and programmable ROM) and/or a flash memory or the like, and stores various data to be held even when the power of the digital camera 10 turns off, such as information set by the user, parameters set when the digital camera 10 was shipped, or the like. The non-volatile memory 66 can store a boot program for the main CPU 62 or a system program, if necessary. On the other hand, the main memory 68 is generally composed of a relatively inexpensive memory having a larger capacity, such as a DRAM. The main memory 68 has a function of a frame memory for storing data output from the image capturing unit 20, a function of a system memory for loading necessary programs, and a function of a working area. The non-volatile memory 66 and the main memory 68 communicate with the parts in the processing unit 60 and other parts outside the processing unit 60 via a main bus 82.

The YC processor 70 subjects the digital image data to YC conversion so as to generate a luminance signal Y and color-difference signals B-Y and R-Y. The luminance signal and the color difference signals are temporarily stored in the main memory 68 by the memory controlling unit 64. The compress/expand controller 78 successively reads the luminance signal and the color-difference signals from the main memory 68 and compresses the read signals. The resultant data (hereinafter, simply referred to as "compressed data") is written into a memory card, that is a kind of the optional device 76, via the optional device controller 74.

The processing unit 60 further includes an encoder 72. The encoder 72 inputs the luminance signal and the color-difference signals, converts these input signals into a video signal (NTSC or PAL signal) and then outputs the video signal from a video output terminal 90. In a case where the video signal is generated from the data stored in the optional device 76, the data is first supplied to the compress/expand processor 78 via the optional device controller 74, and is then subjected to a necessary expansion operation in the compress/expand processor 78. Finally, the expanded data is converted into the video signal by the encoder 72.

The optional device controller 74 performs generation of a signal or signals required by the main bus 82 and the optional device 76, logical transform, or voltage conversion in accordance with the specification of signals accepted by the optional device 76 and the bus-specification of the main bus 82. The digital camera 10 may support a device other than the aforementioned memory card, for example, a standard I/O card conforming to PCMCIA. In this case, the optional device controller 74 may be composed of an LSI for controlling a bus for PCMCIA.

The communication I/F 80 controls protocol conversion according to the communication specification supported by the digital camera 10, such as USB, RS-232C, Ethernet, Bluetooth, IrDA or the like. The communication I/F 80 includes a driver IC, if necessary, and communicates with an external device including a network via a connector 92. In addition, the digital camera 10 may be configured to allow data communication with external device such as a printer, a sing-along machine (karaoke), or a game player, by means of a special I/F, other than the above-mentioned standard specification.

The display unit 100 includes an LCD monitor 102 and an LCD panel 104 that are respectively controlled by a monitor driver 106 and a panel driver 108. The LCD monitor 102, that is about 2-inch LCD panel, for example, is provided on the back face of the digital camera 10 and displays a current mode such as a capturing mode or a playback mode, magnification of the image capturing or the playback image, the residual amount of the battery cell, the date and time, a screen for setting modes, an image of the subject, or the like. The LCD panel 104 is a small monochrome LCD, for example, and is provided on the upper face of the digital camera 10. The LCD panel 104 simply displays information such as the image quality ("FINE", "NORMAL", or "BASIC", for example), ON/OFF of the electronic flash, the number of images normally capturable, the number of pixels, and the battery capacity or the like.

The operating unit 110 includes mechanisms and electric members required for the user to set or instruct the operation and the mode of the digital camera 10 to the digital camera 10. A power switch 112 determines on/off of the power of the digital camera 10. The release switch 114 has a two-step structure allowing half-pressing and complete-pressing of it. For example, when the release switch 114 is half-pressed, AF and AE are locked. Then, the release switch 114 is completely pressed, a shot image is taken into the digital camera 10 and is recorded in the main memory 68 and/or the optional device 76 after necessary signal processing and data compression are performed. The operating unit 110 may receive the setting by the user via other means than the aforementioned switches, such as a rotary mode dial or a cross key. The other means that can be used is generally shown as a function setting unit 116 in FIG. 2. The operations or functions that can be set by the operating unit 110 include "file format", "special effect", "print", "determine/save", and "change display", for example. The zoom switch 118 determines the magnifying power.

The digital camera 10 having the above-mentioned structure operates in the following manner. First, the power switch 112 of the digital camera 10 turns on, so that the power is supplied to the respective units of the digital camera 10. The digital camera 10 has a plurality of operation modes including at least the capture mode and the playback mode. For example, the main CPU 62 determines which of the operation modes is currently selected by checking the state of the function setting section 116.

In the capture mode, the main CPU 62 monitors the state of the release switch 114. When it is detected that the release switch 114 is half-pressed, the main CPU 62 obtains the luminance data and the distance data from the luminance sensor 54 and the distance sensor 52, respectively. Based on the obtained data, the capture controlling unit 40 works to adjust the focus of the lens section 22, the aperture size of the diaphragm and the like. When the adjustment has been finished, the user is notified that the adjustment was finished, for example, by characters displayed on the LCD monitor 102, such as "stand-by". Then, the main CPU 62 monitors the state of the release switch 114 whether or not it is completely pressed. When the release switch 114 is completely pressed, the shutter 26 is closed after a predetermined shutter time period and the stored electric charges of the CCD 30 are then drained out to the capture-signal processor 32. The digital image data generated by the processing by the capture-signal processor 32 is output to the main bus 82. The output digital image data is stored temporarily in the main memory 68 and thereafter is subjected to the necessary processing in the YC processor 70 and the compress/expand processor 78. Then, the processed image data is sent to be recorded in the optional device 76 via the recording medium controller 74. The recorded image is displayed by the LCD monitor 102 at a predetermined period while being frozen, thereby the user can confirm the shot image. As described above, a sequence of the capturing operation is finished.

On the other hand, in the playback mode, the main CPU 62 reads the last shot image from the main memory 68 via the memory controlling unit 64. The LCD monitor 102 displays the read image. In this state, when the user instructs the digital camera 10 via the function setting section 116 to perform "NEXT" or "BACK" operation, the next image or the image just before the currently played image is read out to be displayed by the LCD monitor 102.

In the present embodiment, the image capturing unit 20 captures parallax images of the subject at two or more different viewpoints.

Figure 3:
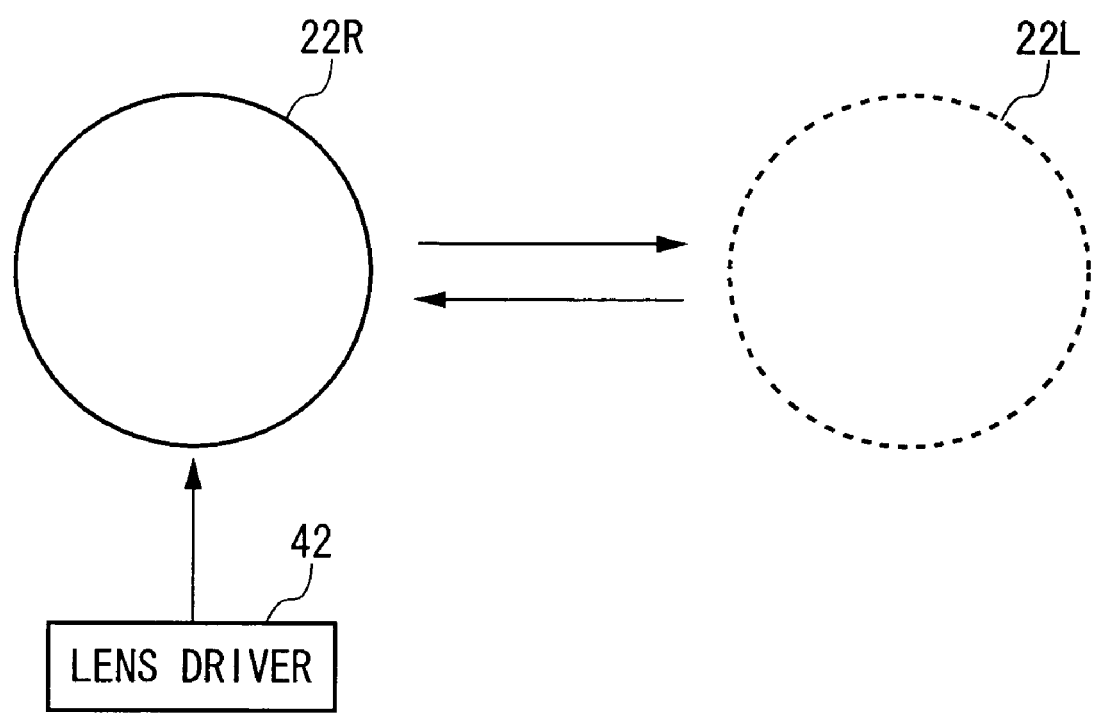
FIG. 3 shows an exemplary arrangement of a lens section of the image capturing apparatus.

FIG. 3 shows an exemplary arrangement of the lens section 22 of the image capturing unit 20. FIG. 3 is a view of the lens section 22 seen from the front side of the digital camera 10. As the lens section 22, one lens is provided. The lens driver 42 moves the lens section 22 to viewpoints 22R and 22L so as to capture the parallax images when the subject to be shot is viewed from the different viewpoints by means of the CCD 30.

The lens driver 42 may move the entire image capturing unit 20 so as to capture the parallax images at the different viewpoints. According to this method, that is, a motion stereo method in which a part or the whole of the image capturing unit is moved to perform the image capturing at the different viewpoints, it is possible to simplify an arrangement of an image capturing apparatus and to reduce the apparatus size as compared to the image capturing by a compound-eye stereo method that uses two or more cameras, thereby implementing the apparatus more economically. Moreover, it is easier to adjust the image-capturing conditions including the focusing of the image-capturing apparatus.

The CCD 30 of the image capturing unit 20 may be provided for each of the viewpoints separately from the CCD 30 for another viewpoint, so as to allow the lens section 22 to receive the image of the subject formed at each viewpoint. Moreover, a single CCD 30 may be provided that can receive the images of the subject formed at two different viewpoints.

The CCD 30 in the present embodiment is one example of the solid-state image sensor. The solid-state image sensor is an image sensor that is formed and integrated by semiconductor techniques. In the solid-state image sensor, a number of pixels each having a function of photo-electric conversion and a function of storing electric charges are arranged two-dimensionally on a semiconductor substrate. The solid-state image sensor receives light converged by the lens section 22 and stores the electric charges by the photo-electric conversion. The image of the stored electric charges is scanned in a predetermined order so as to be read out as an electric signal.

The solid-state image sensor preferably includes a semiconductor device including a light-receiving unit for receiving light incident thereon and performing the photo-electric conversion, a package for accommodating the semiconductor device, a transparent protective member arranged on the package to be opposed to the semiconductor device that allows the light to enter the light-receiving unit; and a light-blocking member having a higher light-shielding performance than that of the transparent protective member, the light-shielding member being arranged on the outer or inner surface of the transparent protective member. This arrangement can improve the quality of the image captured. Moreover, the transparent protective member may improve the resolution of the formed image by having a microlens function. Furthermore, a color image may be captured by providing a color filter between the light-receiving unit and the transparent protective member, on the transparent protective member, or inside of the transparent protective member.

It is desirable that the CCD 30 in the present embodiment is a charge coupled device (CCD) one-dimensional image sensor (linear sensor) or two dimensional image sensor (area sensor) that has a sufficiently high resolution in order to allow the precise detection of the parallax in the parallax images. Other than the CCD, any of an MOS image sensor, a CdS-Se direct-type image sensor, an a-Si (amorphous silicon) direct-type image sensor or a bipolar direct-type image sensor may be used as the solid-state image sensor.

Moreover, the lens section 22 may include an optical lens system for actually taking an image of the subject, other than the optical lens system for capturing the parallax image. In this case, the optical lens system for the actual image capturing and the optical lens system for the parallax-image capturing may record the images on two different CCDs 30, respectively. The optical lens system for the actual image capturing may be a standard optical lens, a wide-angle lens or a fish-eye lens having a wider viewing angle. The CCD 30 onto which the image is formed by the optical lens system for the actual image capturing has a different resolution or sensitivity from that of the CCD 30 which receives the image formed by the optical lens system for the parallax-image capturing.

The processing unit 60 in the present embodiment obtains information regarding the depth of the subject based on the parallax images of the subject captured by the image capturing unit 20.

Figure 4:
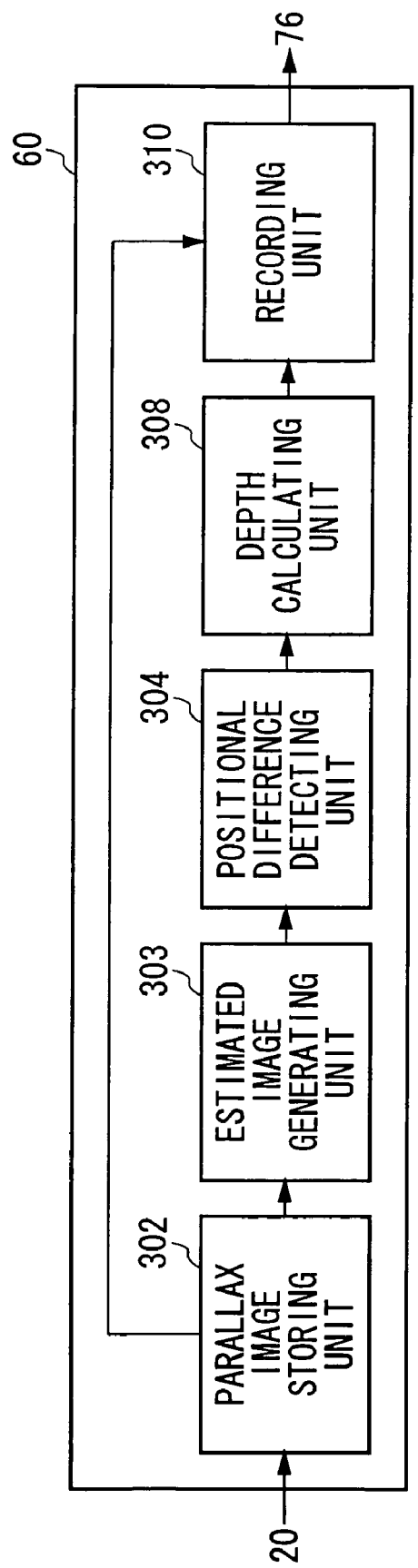
FIG. 4 is a functional block diagram of a processing unit of the image capturing apparatus according to an embodiment of the present invention.

FIG. 4 is a functional block diagram of the processing unit 60. The processing unit 60 includes a parallax image storing unit 302, an estimated image generating unit 303, a positional difference detecting unit 304, a depth calculating unit 308, and a recording unit 310.

The parallax image storing unit 302 stores three or more images shot by the image capturing unit 20 and times when the three or more images were shot. The images include two images shot at a standard viewpoint and an image shot at a reference viewpoint. The captured time may be a relative value, for example, a time interval between the image capturing operations. The estimated image generating unit 303 selects, from the three or more images stored in the parallax image storing unit 302, the images shot at the standard viewpoint, and then generates an estimated image that is estimated to be shot at the standard viewpoint at the time at which the image was actually shot at the reference viewpoint, by using the two or more images shot at the standard viewpoint. The details of the generation of the estimated image are described later. The positional difference detecting unit 304 detects the amount of the positional difference between a particular region of the subject image in the image actually shot at the reference viewpoint and a corresponding region in the estimated image.

The depth calculating unit 308 calculates the depth of the particular region of the subject based on a plurality of positional differences detected by the positional difference detecting unit 304. The calculation of the depth is based on the principle of triangulation. By the positional difference detecting unit 304 and the depth calculating unit 308, the depth of the subject can be calculated for apart or the entire subject for which the parallax images were shot.

The depth calculating unit 308 may input the information regarding the depth of the subject thus calculated to the capture controlling unit 40. In this case, the capture controlling unit 40 controls the focus driver 44, the diaphragm driver 46 and the shutter driver 48 based on the information of the depth of the subject so as to adjust the focal length, the aperture size of the diaphragm and the shutter speed.

The recording unit 310 records the information regarding the depth of the subject calculated by the depth calculating unit 308 and the parallax images of the subject stored in the parallax image storing unit 302 in the optional device 76.

The functions of the estimated image generating unit 303, the positional difference detecting unit 304 and the depth calculating unit 308 can be achieved, for example, by cooperation of the main CPU 62 shown in FIG. 2 with at least one program stored in or loaded into the main memory 68 or the non-volatile memory 66. In a case where the main CPU 62 has an internal memory, the required program may be stored in the internal memory and the above-described functions may be realized by firmware. The main memory 68 or the non-volatile memory 66 can store the parallax image data to be stored in the parallax image storing unit 302 of the processing unit 60. Moreover, the parallax image data may be compressed by the compress/expand processor 78. The function of the recording unit 310 of the processing unit 60 may be achieved by, for example, the optional device controller 74. Furthermore, the operating unit 110 may specify a particular region of the image of the subject to the processing unit 60 in accordance with the user's instruction so as to make the depth calculating unit 308 perform the depth calculation for the particular region. The design for realizing the aforementioned functions of the processing unit 60 in the digital camera 10 has a considerable freedom.

Figure 5:
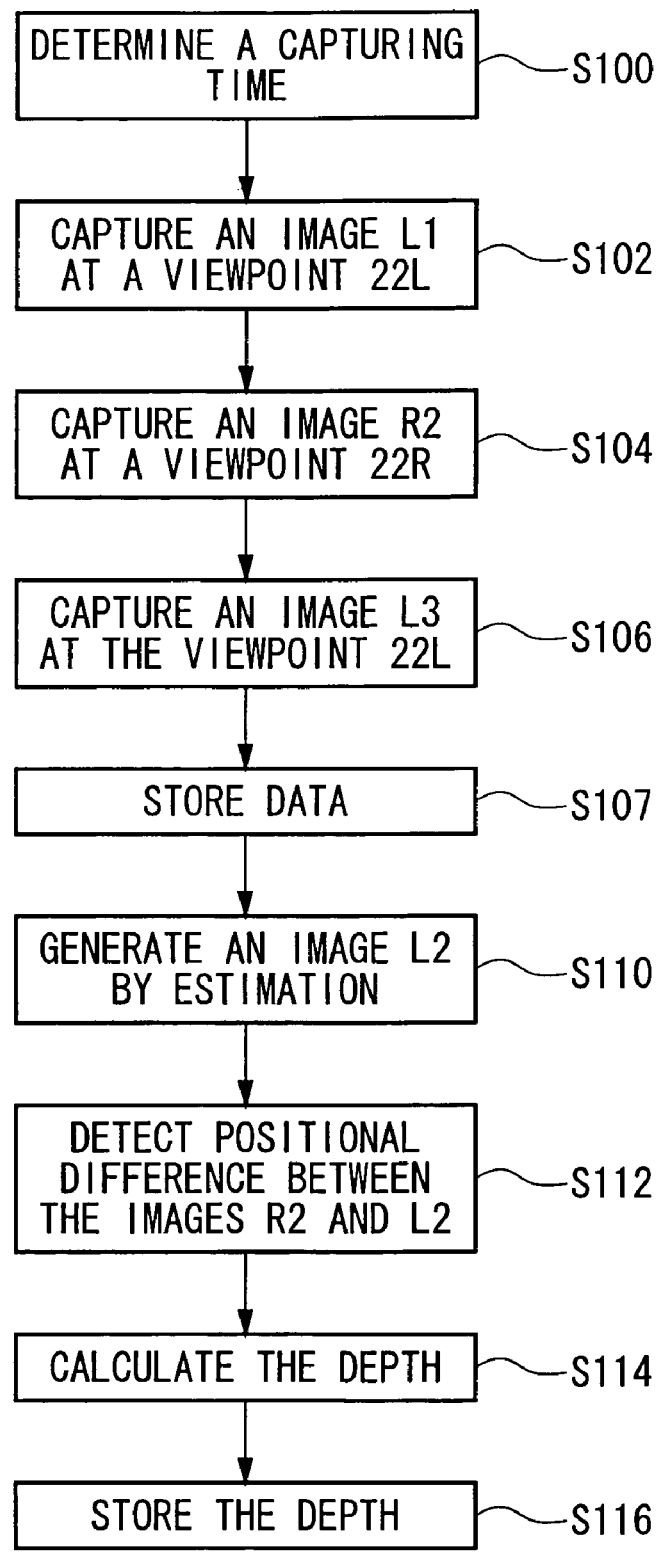
FIG. 5 is a flowchart of an image capturing operation.

FIG. 5 is a flowchart of the image capturing operation according to the present embodiment. The capturing system CPU 50 determines a time interval T (seconds) between the image capturing operations based on the shutter speed determined as described above, and informs the lens driver 42, the shutter driver 48 and the image capturing unit 20 of the determined time interval T (seconds) (Step S100). The lens driver 42 moves the lens section 22 to a viewpoint 22L, and the shutter driver 48 and the image capturing unit 20 cooperate with each other to capture an image of the subject, thereby obtaining an image L1 (Step S102). The lens driver 42 then moves the lens section 22 to a viewpoint 22R. The shutter driver 48 and the image capturing unit 20 cooperate with each other to move the image of the subject after T seconds has passed after the previous image capturing, so that an image R2 is obtained (Step S104). The lens driver 42 then moves the lens section 22 to the viewpoint 22L. The shutter driver 48 and the image capturing unit 20 cooperate to capture the image of the subject after T seconds has passed after the previous image capturing, so that an image L3 is obtained (Step S106).

The parallax image storing unit 302 receives image data of the images L1, R2 and L3 and data of the time interval T and stores the received data (Step S107). The estimated image generating unit 303 generates an image L2 from the viewpoint 22L at the time at which the image R2 was captured, by estimation from the images L1 and L3 (Step S110). The positional difference detecting unit 304 then detects the amount of the positional difference of a particular region of the subject between the image R2 and the estimated image L2, the positional difference being caused by the parallax (Step S112). The depth calculating unit 308 calculates the depth of the particular region of the subject from the amount of the positional difference based on the principle of triangulation (Step S114). The recording unit 310 stores the depth received from the depth calculating unit 308 (Step S116). According to this capturing method, it is possible to effectively obtain the depth of the subject by the motion stereo method even if the subject is moving.

Figure 6:
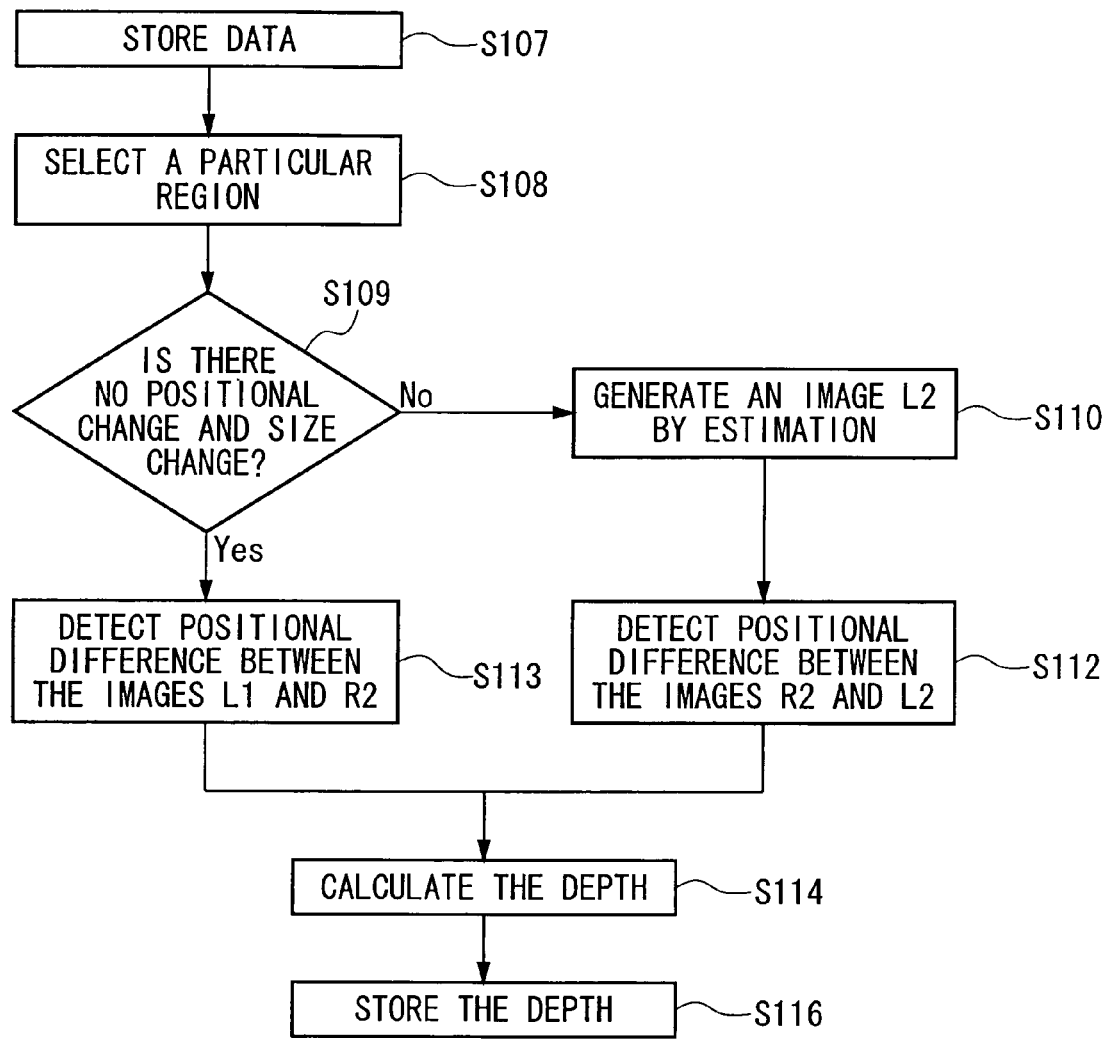
FIG. 6 is a flowchart of image processing procedure.

FIG. 6 is a flowchart of a procedure for separating a region in the image of the subject where the movement of the subject can be ignored from a region where the movement of the subject cannot be ignored. The parallax image storing unit 302 receives the image data of the images L1, R2 and L3 and the data of the time interval T, and stores the received data (Step S107). The estimated image generating unit 303 selects a particular region in the image (Step S108). The estimated image generating unit 303 determines whether or not, for an image of the particular region of the subject, the difference of the position and the size difference between the images L1 and L3 are equal to or smaller than predetermined values, respectively, (Step S109). In a case where either of the positional difference or the size difference is larger than the predetermined value, the estimated image L2 is generated in a similar manner to that shown in FIG. 5 (Step S110), and the positional difference of the particular region of the subject between the image R2 and the estimated image L2, that is caused by parallax, is detected (Step S112). Then, the depth of the particular region is calculated from the positional difference (Step S114). The calculated depth is stored in the recording unit 310 (Step S116). On the other hand, in a case where the positional difference and the size difference are equal to or smaller than the predetermined values, the positional difference detecting unit 304 detects the positional difference of the image of the particular region between the image L1 and R2 (Step S113). The depth calculating unit 308 then calculates the depth of the particular region of the subject from the thus calculated positional difference based on the principle of triangulation (Step S114). The recording unit 310 stores the calculated depth (Step S116). According to this procedure, the image estimation can be omitted for the region where there is no or little movement.

Moreover, each of the images L1 and L3 is divided into a plurality of areas, and the areas are classified depending on whether or not an image in each area of one of the images L1 and L3 is coincident with an image in the corresponding area of the other of the images L1 and L3. For the area that does not include the image coincident with that in the corresponding area, the estimated image L2 is generated in a similar manner to that shown in FIG. 5 (Step S110); the positional difference between the image R2 and the estimated image L2 caused by parallax is detected (Step S112); and the depth is calculated from the calculated positional difference (Step S114). The calculated depth is stored in the recording unit 310 (Step S116). For the area that includes the image coincident with that in the corresponding area, the positional difference detecting unit 304 detects the positional difference of the image of the particular region between the images L1 and R2 (Step S113), and the depth calculating unit 308 calculates the depth of the particular region of the subject based on the principle of triangulation by using the positional difference (Step S114). The recording unit 310 stores the thus calculated depth (Step S116). According to this procedure, the image estimation can be omitted for the area where there is little movement of the subject.

Next, the image estimation method is described. The image processing is performed for each of small areas obtained by dividing the image of the subject. This is because the depth and the degree of the movement are varied between the areas.

Figure 7A:
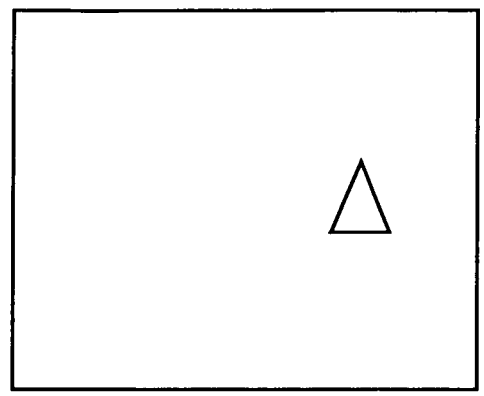
FIGS. 7A, 7B and 7C illustrate an exemplary image estimation method based on a time of the image capturing.
Figure 7B:
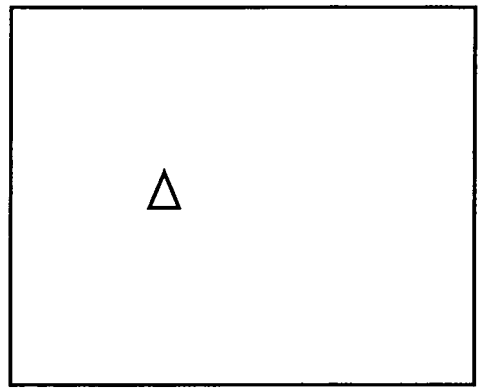
Figure 7C:
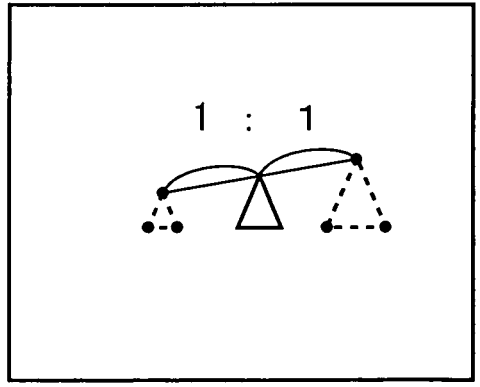

FIGS. 7A, 7B and 7C illustrate an exemplary image estimation method in a case where a human nose is considered to be the particular region of the subject. Since the time interval between the image capturing operations is sufficiently short, the change of the position caused by the move of the subject can be approximated to be linear with respect to the change of the time. When the image capturing operations are performed with constant time intervals as in the flow shown in FIG. 5, characteristic points are determined in the images L1 and L3 as shown in FIGS. 7A and 7B so as to correspond to each other. In this case, the corresponding characteristic point in the estimated image L2 is determined to be a point that internally divides a line connecting the characteristic points in the images L1 and L3 by a ratio of 1:1. In a case of not-constant time intervals, the characteristic point can be calculated similarly by internal or external division. Please note that the image capturing operation can be performed for the same viewpoint three or more times. In this case, the change of the position caused by the move of the subject may be approximated by using multinomial expression. The use of the multinomial expression improves the approximation.

Figure 8A:
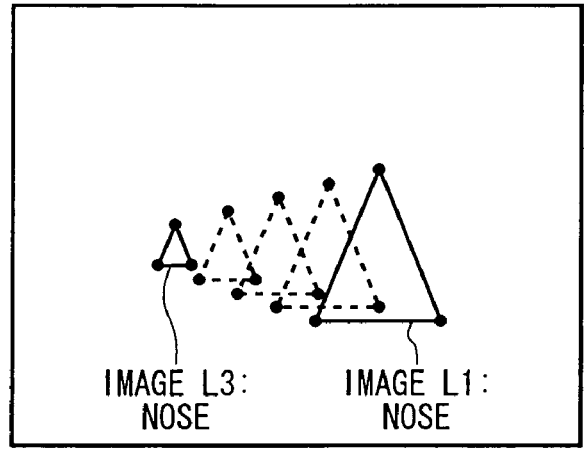
FIGS. 8A and 8B illustrate another exemplary image estimation method based on a size of a particular region.
Figure 8B:
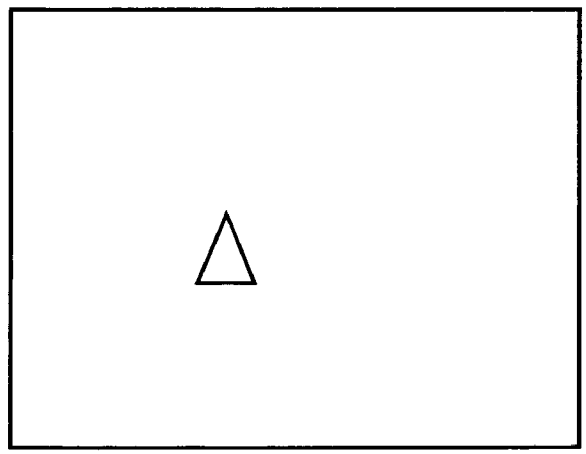

FIGS. 8A and 8B illustrate another exemplary image estimation method in the case where the human nose is assumed to be the particular region. When internally or externally divided points of the characteristic points in the images L1 and L3 are obtained from the images L1 and L3, as shown in FIG. 8A, a set of estimated images L of the particular region of the subject seen from the viewpoint 22L can be estimated. From the estimated image set L, one image that includes the nose image having the same size as the nose image in the image R2 shown in FIG. 8B is selected as the estimated image L2 that is to correspond to the image R2. According to this method, the image estimation can be performed without the information of the time at which the image capturing operations were performed. Moreover, even if the subject increases its speed, excellent approximation can be obtained as long as the movement of the subject is close to a line. Furthermore, this method may be used for interpolation of the estimation method illustrated in FIGS. 7A–7C.

Figure 9:
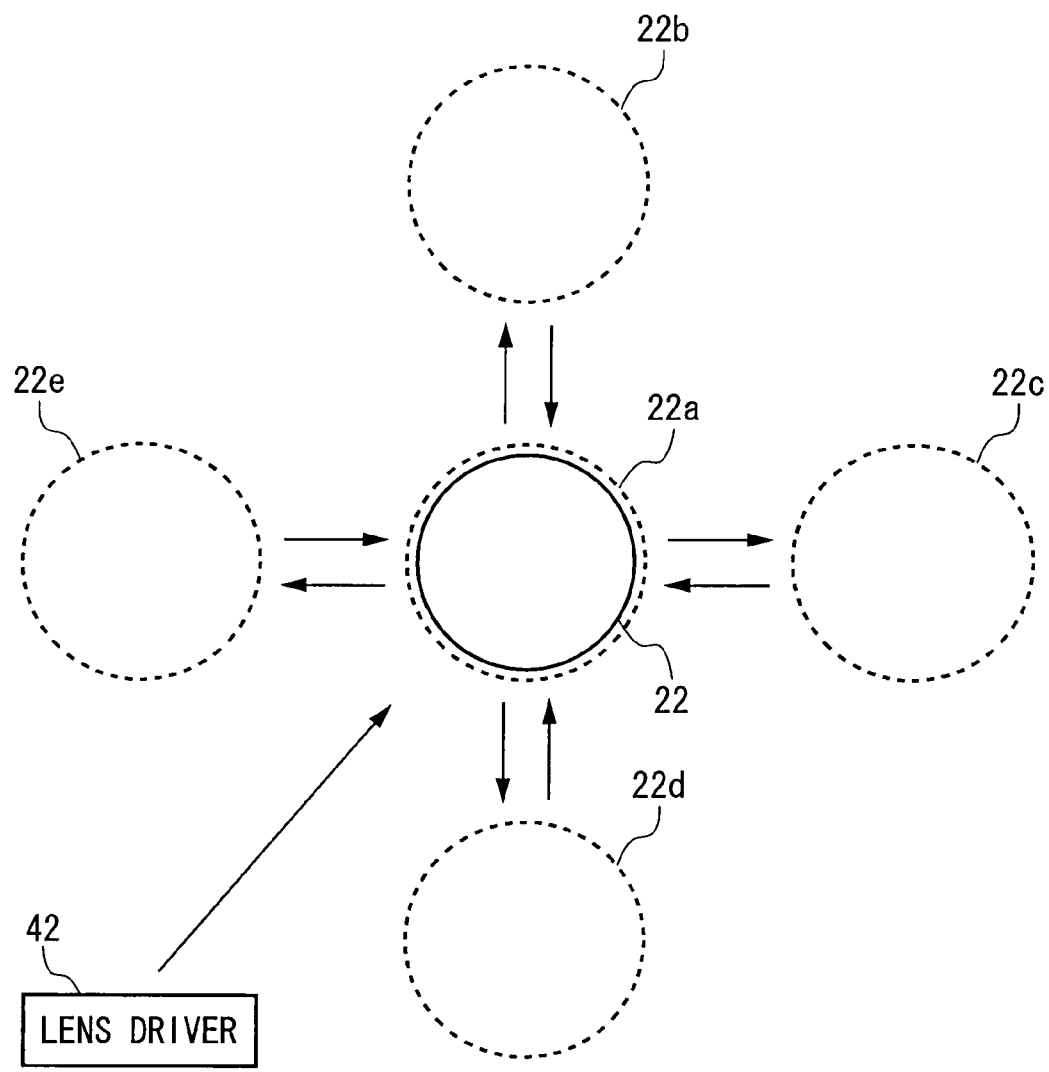
FIG. 9 shows another exemplary arrangement of the lens section of the image capturing apparatus.

FIG. 9 shows another exemplary arrangement of the lens section 22 of the image capturing unit 20, and is a view of the lens section 22 when the image capturing unit 20 is seen from the front side thereof. Preferably, the lens driver 42 is capable of moving the viewpoint of the image capturing unit 20, for instance the lens section 22, to three points which are not aligned at least one line. Particularly, in the present invention as shown in this figure, the lens driver 42 moves the viewpoint of the image capturing unit 20 to a center and apices of a diamond. Namely, the viewpoints are set to positions 22a, 22b, 22c, 22d and 22e that are a center and apices of a diamond, respectively. Alternately, the lens driver 42 may be capable of moving the viewpoint of the image capturing unit 20 to a center and apices of a square. In a case of using the combination of the viewpoints 22a and 22c, when the subject is greatly shifted from the center of the image toward right or left, a "blind region" for which it is hard to calculate the depth is generated since the positional difference caused by the parallax becomes small. Thus, instead of the combination of the viewpoints 22a and 22c, the use of the combination of the viewpoints 22a and 22b enables the depth calculation. In order to capture the parallax images of the subject to detect the positional difference caused by parallax for a wider region without blind region, it is effective to use five viewpoints set as described above. As the lens section 22, one lens is provided. The lens driver 42 moves the lens section 22, so that the parallax images when the subject is seen from the different viewpoints are captured in the CCD 30. Even for a region for which the depth calculation is difficult by using two parallax images captured at two viewpoints, it is possible to calculate the depth by using the parallax image captured at the third viewpoint different from those two viewpoints together with the parallax images captured at those two viewpoints, thus the blind region can be eliminated. Thus, it is possible to calculate the depth of the subject with high precision for a wider viewing range.

Figure 10:
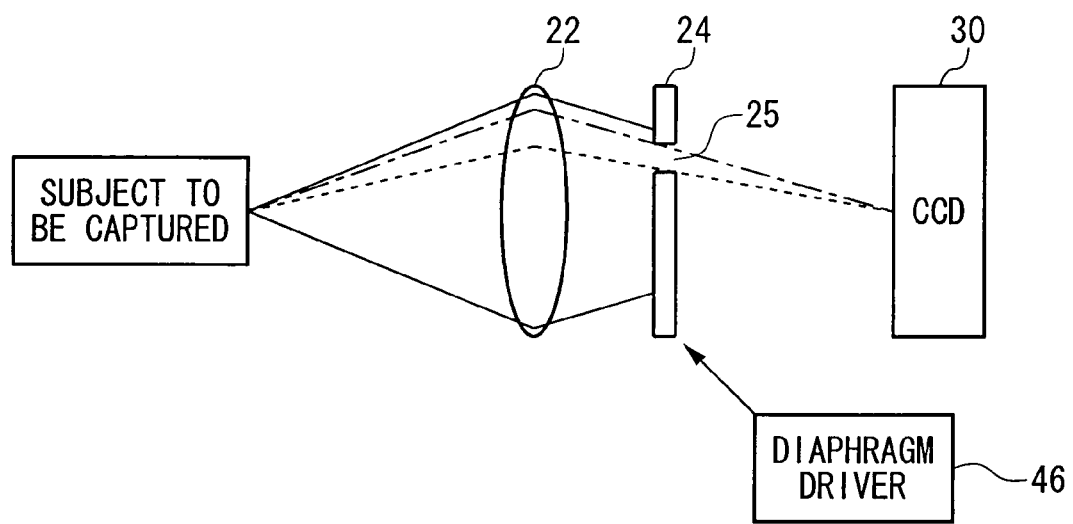
FIG. 10 shows still another exemplary arrangement of the lens section of the image capturing apparatus.
Figure 11:
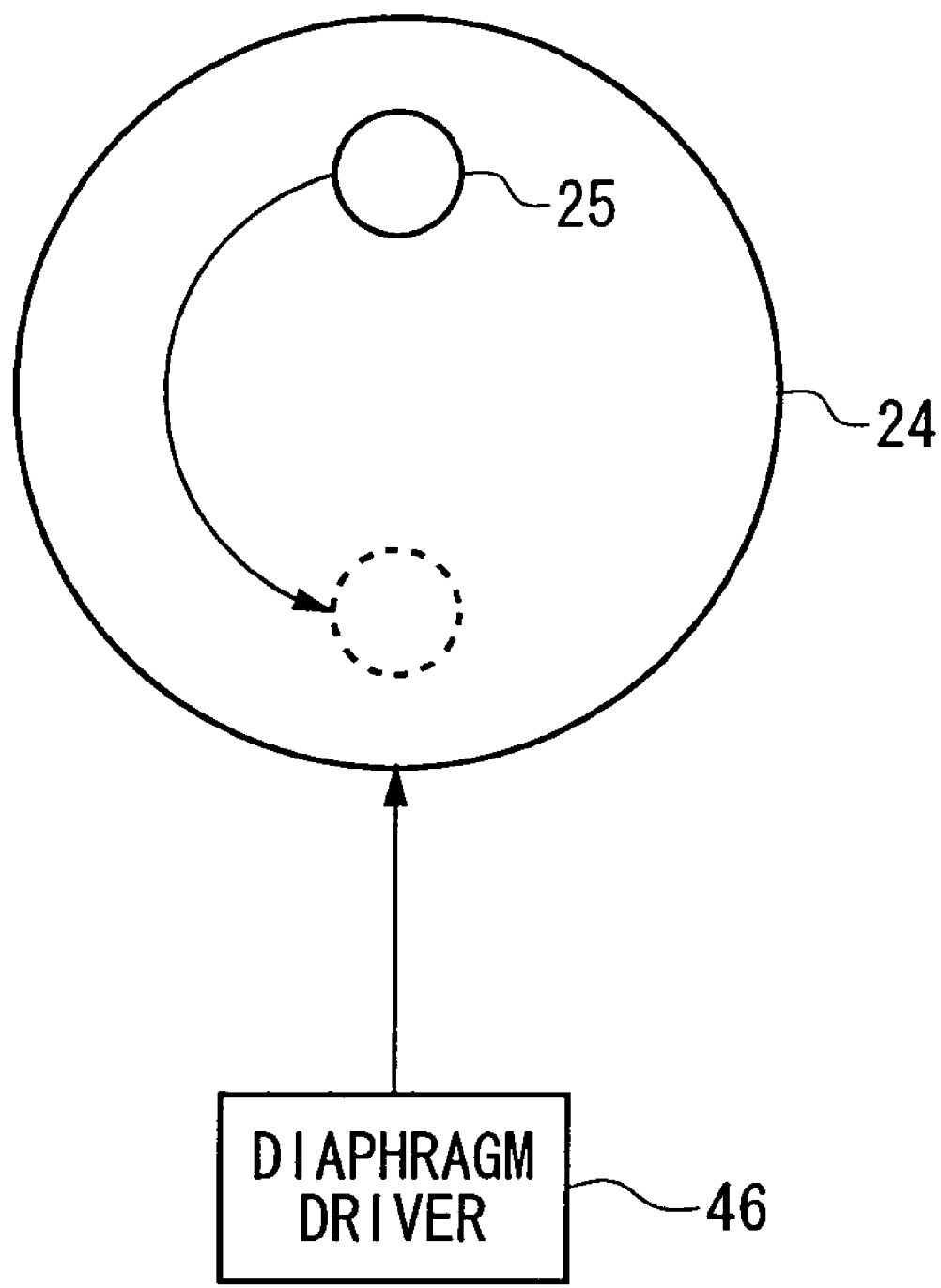
FIG. 11 shows an exemplary diaphragm in the image capturing apparatus.

FIG. 10 shows another example of a manner in which the image capturing unit 20 changes the viewpoint. The diaphragm 24 is one example of a light-limiting unit. The lens section 22 is fixed. The diaphragm driver 46 moves the aperture 25 of the diaphragm 24 parallel to a pupil plane of the lens section 22. The position of the aperture 25 may be changed by rotating the diaphragm 24, as shown in FIG. 11. Moreover, the position of the aperture 25 may be changed by opening/closing a plurality of apertures by using a liquid crystal optical shutter. By changing the position of the aperture as described above, the image capturing operations are enabled at a plurality of viewpoints. When the aperture 25 is moved, the position of an image of a region of the subject, that exists on a plane where the lens section 22 is in focus, is not changed. On the other hand, the position of an image of a region of the subject that is not in focus, i.e., a blurred image, is moved when the aperture 25 is moved. In addition, the moving amount of the blurred image increases with the distance from the in-focus plane. By using this fact, the depth is calculated. In this case, the depth calculation can be performed only by moving the diaphragm 24. Thus, it is possible to make the moving part compact and light as compared to a case of moving the entire image capturing unit 20 or the lens section 22, thus simplifying the moving system and control therefor. Moreover, since the time required for moving the viewpoint and the time interval between the image capturing operations can be shortened, the precision of the image estimation can be improved.

As described above, according to the image capturing apparatus of the present embodiment, a pair of parallax images in which motion factor is cancelled can be generated even if the subject is moving three-dimensionally. Although the motion stereo method has an advantage that the parallax images can be economically taken with a small apparatus, it is not effective for the moving subject because the parallax images are successively taken and thus the captured times are different. On the other hand, according to the present embodiment, an image at a particular time is estimated by using a plurality of images shot at the same viewpoint. The estimated image is then combined with an image captured at another viewpoint at the particular time so as to provide a pair of parallax images captured at the same time by the motion stereo method. Thus, the depth can be calculated effectively.

(Embodiment 2)

Figure 12:
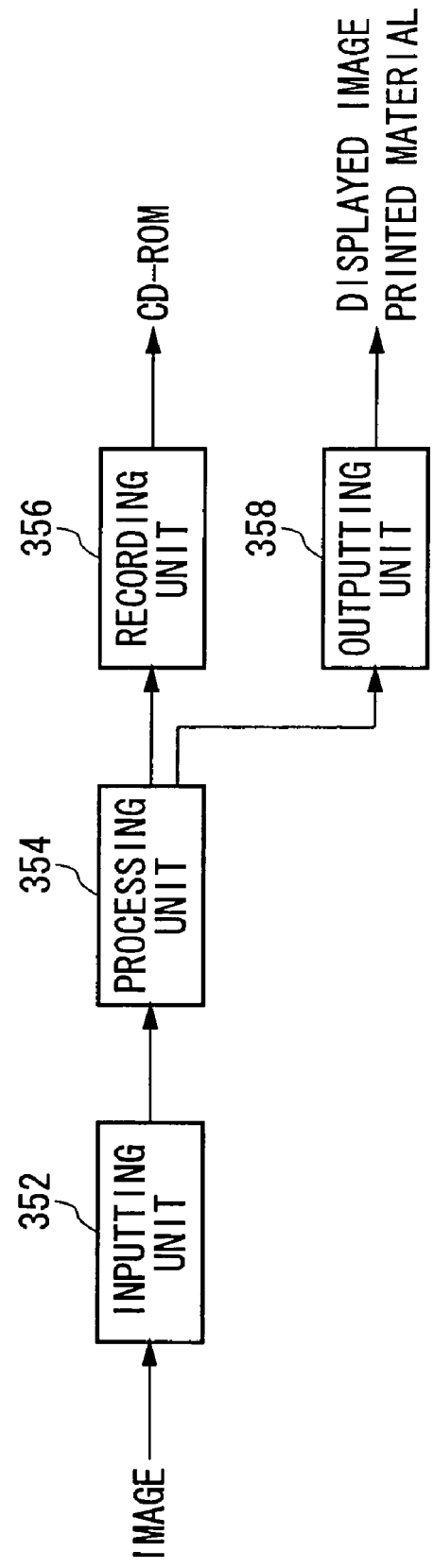
FIG. 12 shows an exemplary image processing apparatus according to the present invention.

The second embodiment of the present invention is described. FIG. 12 is a diagram schematically showing an arrangement of a lab-system 350 as an image processing apparatus, in which development and editing of photographs can be performed. The lab-system 350 includes an inputting unit 352, a processing unit 354, a recording unit 356 and an outputting unit 358.

The inputting unit 352 inputs image data of a subject. As the image data, images of the subject when the subject is seen from different viewpoints are input. In a case of inputting digital images of an object captured by a digital camera or the like, a reading apparatus for reading the image data from a removable recording medium, such as a semiconductor memory card, is used as the inputting unit 352. When the image data is read from a floppy disk, an MO, a CD-ROM or the like, a floppy drive, an MO drive, a CD drive or a suitable drive means may be used as the inputting unit 352.

The processing unit 354 stores the image input by the inputting unit 352 and calculates the depth of the subject. The processing unit 354 outputs information regarding the calculated depth together with the image to the recording unit 356. The processing unit 354 may process the image of the subject based on the calculated depth so as to output the processed image to the recording unit 356 and the outputting unit 358.

The recording unit 356 records the information regarding the depth or the image data output from the processing unit 354 into a removable recording medium. As the removable recording medium, an optical recording medium such as a writable CD-ROM or a writable DVD, a magneto-optical recording medium such as an MO, a magnetic recording medium such as a floppy disk, or the like can be used. Thus, as the recording unit 356, a CD-R drive, a DVD drive, an MO drive, a floppy drive or the like can be used. The recording unit 356 may record the information regarding the depth or the image data into a semiconductor memory such as a flash memory or a memory card.

The outputting unit 358 outputs the image data that has been processed and output by the processing unit 354, as an image. For example, in a case of displaying the image on a screen, a monitor for displaying the image is used as the outputting unit 358. In another case of printing the image, a printer such as a digital printer or a laser printer is used as the outputting unit 358.

Figure 13:
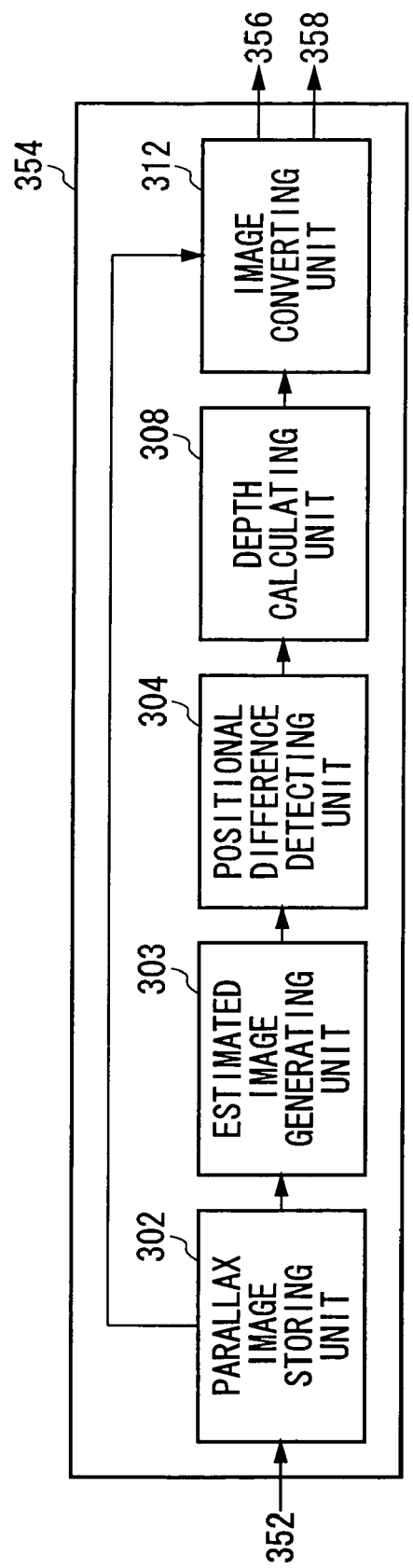
FIG. 13 is a functional block diagram of a processing unit according to another embodiment of the present invention.

FIG. 13 is a functional diagram of the processing unit 354. The processing unit 354 includes a parallax image storing unit 302, an estimated image generating unit 303, a positional difference detecting unit 304, a depth calculating unit 308 and an image converting unit 312.

The parallax image storing unit 302 stores data of three or more images of the subject input by the inputting unit 352, into a semiconductor memory such as an RAM or a magnetic recording medium such as a hard disk. The estimated image generating unit 303 estimates, based on two or more images captured at the same viewpoint, an image of a particular region of the subject that can be assumed to be captured at the same viewpoint at a predetermined time. The positional difference detecting unit 304 detects the positional difference of the position of the image of the particular region, that is caused by parallax, in the combination of the estimated image and another image of the particular region of the subject that was captured at the predetermined time at another viewpoint different from the viewpoint to which the estimated image corresponds. The depth calculating unit 308 calculates the depth of the particular region of the subject by using a plurality of positional differences detected by the positional difference detecting unit 304.

The depth calculation procedure by the estimated image generating unit 303, the positional difference detecting unit 304, and the depth calculating unit 308 is performed in a similar manner to that described in the first embodiment, and therefore the description of the depth calculation is omitted.

The image converting unit 312 processes the image of the subject based on the information regarding the depth of the subject calculated by the depth calculating unit 308. The image converting unit 312 outputs the information regarding the depth of the subject, the parallax images or the processed image to the recording unit 356 and the outputting unit 358.

According to the image processing apparatus of the present embodiment, the information regarding the depth of the subject can be obtained by inputting the parallax images of the moving subject. Moreover, based on the obtained information regarding the depth of the subject, the image processing can be performed to generate drawing data such as a CAD data. Furthermore, when the time interval between the image capturing operations is input, the speed and direction of the movement of the subject can be calculated for each particular region.

(Embodiment 3)

Figure 14:
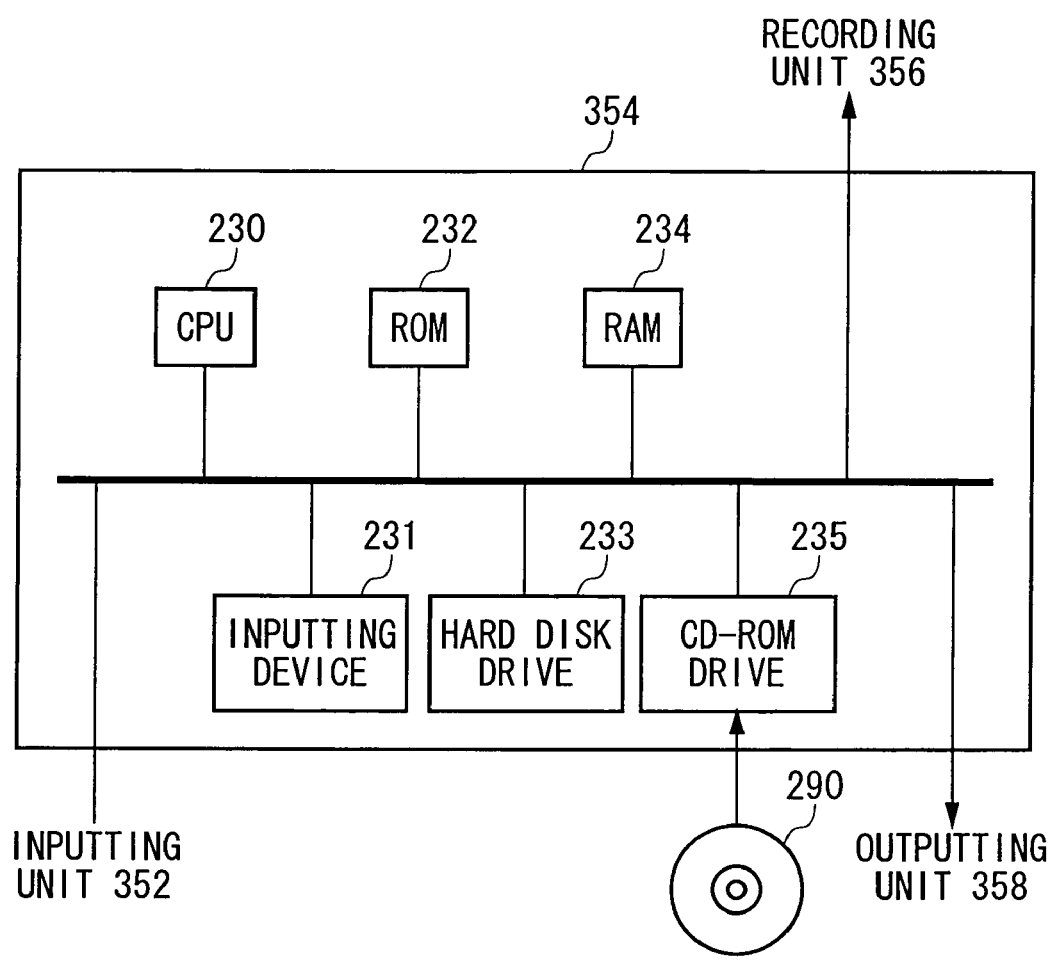
FIG. 14 shows another exemplary image processing apparatus.

The third embodiment of the present invention is described. FIG. 14 is a block diagram of an image processing apparatus according to the present embodiment. The basic structure and operations of the image processing apparatus of the present embodiment are the same as those in the second embodiment except that a computer such as a personal computer or a work station is used as the processing unit 354 of the image processing apparatus.

Referring to FIG. 14, the hardware configuration of the processing unit 354 of the present embodiment is described. A CPU 230 operates based on at least one program stored in a ROM 232 and RAM 234. The user inputs data via an input device 231 such as a keyboard or a mouse. A hard disk drive 233 stores data such as image data, and the program for making the CPU 230 operate. A CD-ROM drive 235 reads data or a program from a CD-ROM 290 to provide the read data or program to at least one of the RAM 234, the hard disk 233 and the CPU 230.

The functional configuration of the program to be executed by the CPU 230 is the same as that of the processing unit 354 of the image processing apparatus of the second embodiment. That is, the program to be executed by the CPU 230 includes a parallax image storing module, an estimated image generating module, a positional difference detecting module, a depth calculating module and an image converting module.

The procedures that the parallax image storing module, the estimated image generating module, the positional difference detecting module, the depth calculating module and the image converting module cause the CPU 230 to perform are the same as the functions and operations of the parallax image storing unit 302, the estimated image generating unit 303, the positional difference detecting unit 304, the depth calculating unit 308 and the image converting unit 312 of the processing unit 354 of the image processing apparatus of the second embodiment, and therefore the description for the procedures is omitted. The program for the above procedures is provided to the user while being stored in a recording medium, for example, the CD-ROM 290. The CD-ROM 290 as an example of the recording medium can store a part or all of the functions and operations of the image processing apparatus described in the present application.

The program for the above procedures may be executed by the CPU 230 after being read from the recording medium directly into the RAM 234. Alternatively, the program for the above procedure may be installed from the recording medium into the hard disk 233 and be read into the RAM 234 so that the CPU 230 executes the program.

As the recording medium, other than the floppy disk and the CD-ROM, an optical recording medium such as a DVD or a PD, a magneto-optical recording medium such as an MD, a tape-like medium, a magnetic recording medium, or a semiconductor memory such as an IC card or a miniature card can be used.

The above program may be stored in a single recording medium or a plurality of recording media while being divided into a plurality of parts. Moreover, the program may be stored in the recording medium while being compressed. The compressed program may be expanded and read into another recording medium such as the RAM 234 to be executed. Furthermore, the compressed program may be expanded by the CPU 230, installed into the hard disk 233, and then read into another recording medium such as the RAM 234 so as to be executed.

The CD-ROM 290 as an example of the recording medium may store the above program provided by a host computer via a communication network. The program stored in the recording medium may be stored in a hard disk of the host computer, sent to the computer as the image processing apparatus of the present embodiment from the host computer via the communication network, and read into another recording medium such as the RAM 234 to be executed.

The recording medium storing the aforementioned program is used only for manufacturing the image processing apparatus of the present application and it is therefore apparent that manufacturing or selling such a recording medium as business can constitute infringement of the right based on the present application.

(Embodiment 4)

Next, the fourth embodiment of the present invention is described. An image capturing apparatus of the present embodiment is an electronic device such as a note-type computer including a camera therein and a PDA including a camera therein. In these cases, a computer part of the note-type computer or PDA functions mainly as the processing unit 354 shown in FIG. 14. The image capturing apparatus of the present embodiment has a structure obtained by modification of the first embodiment to replace the processing unit 60 with the hardware configuration of the processing unit 354 shown in FIG. 14. The basic structure and operations of the image capturing apparatus of the present embodiment are the same as those in the first embodiment.

The hardware configuration of the processing unit 354 of the present embodiment is the same as that of the processing unit 354 of the third embodiment, and therefore the description is omitted. The functional configuration of the program to be executed by the CPU 230 is also the same as the functional configuration of the processing unit 60 of the image capturing apparatus of the first embodiment, and includes a parallax image storing module, an estimated image generating module, a positional difference detecting module, a depth calculating module and a recording module.

The procedures that the parallax image storing module, the estimated image generating module, the positional difference detecting module, the depth calculating module and the image converting module cause the CPU 230 to perform are the same as the functions and operations of the parallax image storing unit 302, the estimated image generating unit 303, the positional difference detecting unit 304, the depth calculating unit 308, and the recording unit 310 in the processing unit 354 of the image capturing apparatus of the second embodiment, and therefore the description for the above procedures is omitted. The program to be executed by the CPU 230 is provided to the user while being stored in a recording medium such as the CD-ROM 290. The CD-ROM 290 as one example of the recording medium can store a part or all of the operations of the image capturing apparatus described in the present application.

The recording medium storing the aforementioned program is used only for manufacturing the image processing apparatus of the present application and it is therefore apparent that manufacturing or selling such a recording medium as business can constitute infringement of the right based on the present application.

In the first embodiment described above, in order to perform the image capturing for the subject at a plurality of viewpoints with different timings, the image capturing is performed at the plurality of viewpoints by moving a position at which the single capturing unit 20 performs the image capturing. Alternatively, instead of moving the single capturing unit, a plurality of capturing units may be provided to perform the image capturing at different timings for the subject. In this case, the capturing units 20 are respectively provided at a plurality of different positions. Please note the term "capturing units" means capturing devices including optical systems physically different from each other. For example, each of the capturing units 20 includes the optical system (the lens section 22, for example), the light-receiving unit (CCD, for example) and the like that are provided separately from those included in the other capturing units 20, but includes the capture-signal processor 32, the electronic flash 26 and the like provided commonly to the other capturing units 20.

Figure 15:
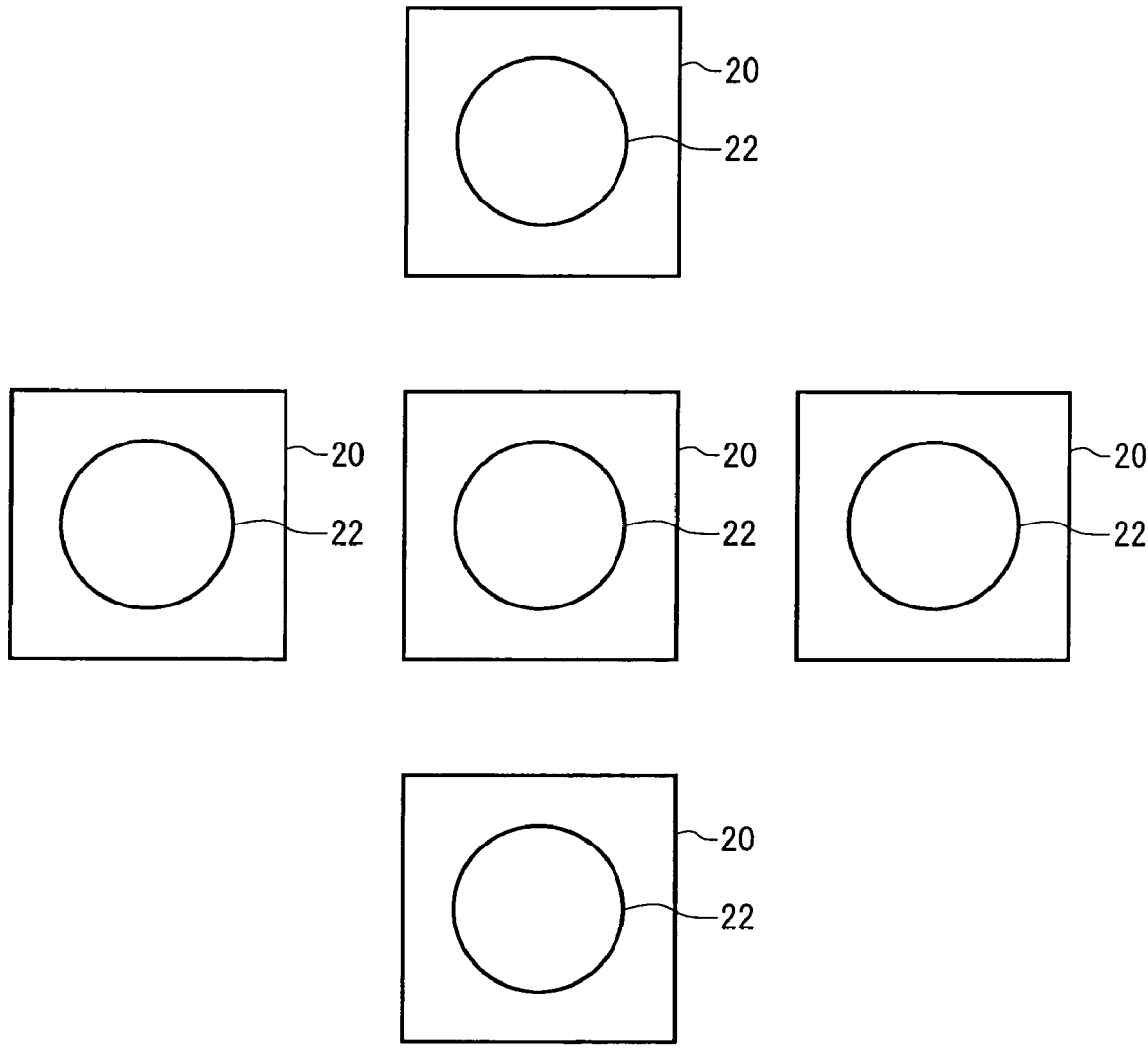
FIG. 15 shows a capturing section including a plurality of capturing units seen from the subject-side.

FIG. 15 is a view of a capturing section including a plurality of capturing units 20 seen from the subject-side. The capturing section includes the capturing units 20 respectively provided at a plurality of different positions. Thus, in the example shown in FIG. 15, the image capturing for the subject at the plurality of viewpoints is realized by providing the plurality of capturing units 20 at different positions. The controlling unit 202 controls, together with the time setting unit 206, times at which the capturing units 20 respectively perform the image capturing for the subject, thereby making the capturing units 20 capture images of the subject successively with different timings. In this operation, the controlling unit 202 makes at least one of the capturing units 20 perform the image capturing for the subject two or more times. The capturing section preferably includes a plurality of capturing units 20 at respective positions which are not aligned on one line. More preferably, the capturing section may include a plurality of capturing units 20 at a center and apices of a diamond. Alternatively, the capturing section may includes a plurality of capturing unit 20 at a center and apices of a square.

The image capturing apparatus may alternately capture images of the subject at two viewpoints, so that the depth of the subject is calculated by using three images successively captured. In this case, the image capturing apparatus can successively obtain the information regarding the depth of the subject in time series, thus generating a three-dimensional moving image, for example.

Figure 16:
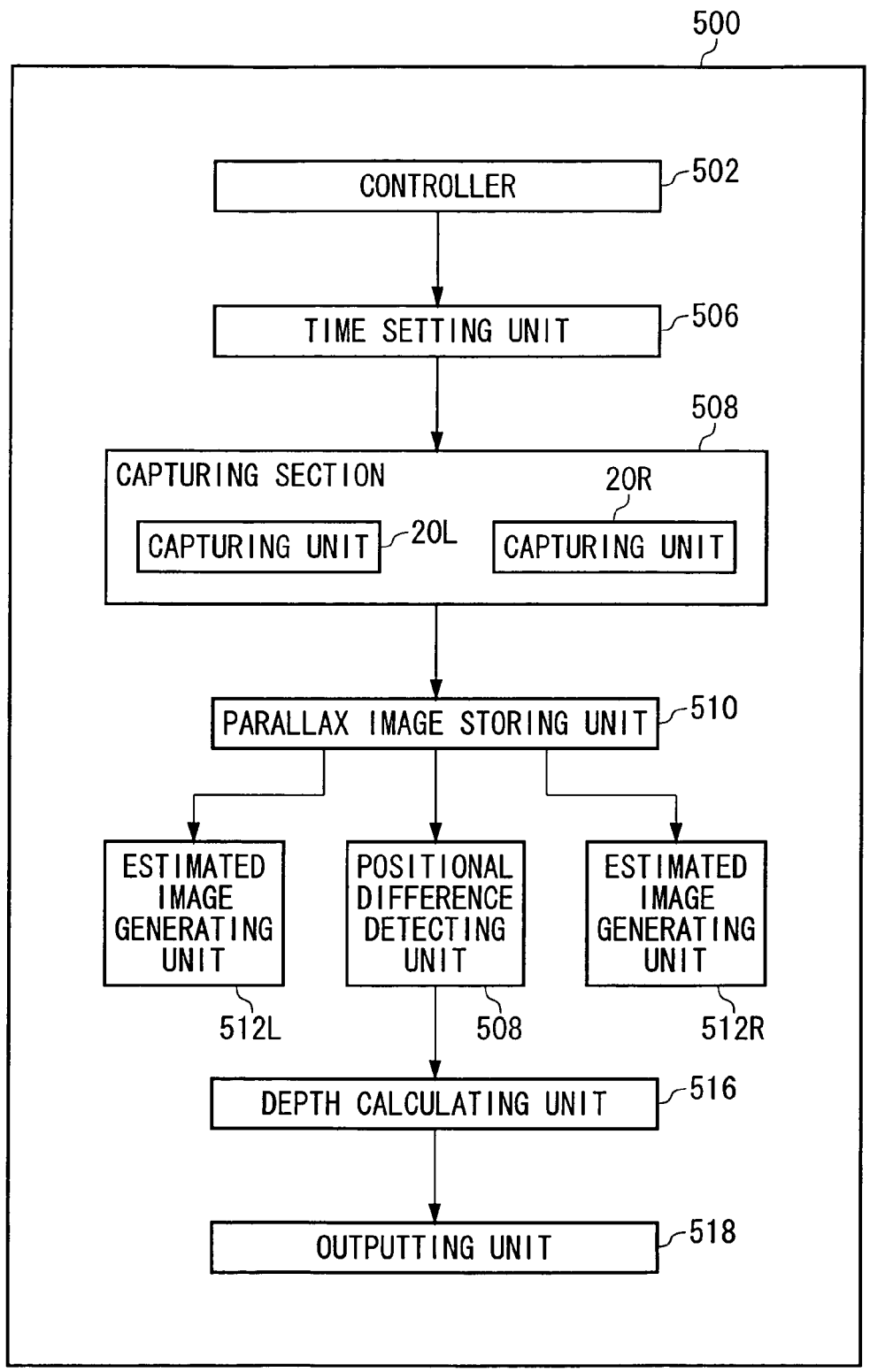
FIG. 16 is a functional block diagram of a three-dimensional modeling system according to an embodiment of the present invention.

FIG. 16 is a functional block diagram of a three-dimensional modeling system 500 as an example of the image capturing apparatus according to the present invention. The three-dimensional modeling system 500 successively obtains the information regarding the depth of the subject in time series to generate the three-dimensional image of the subject. The three-dimensional modeling system 500 includes a controller 502, a time setting unit 506, a capturing section 508, a parallax image storing unit 510, two estimated image generating units 512, a positional difference detecting unit 514, a depth calculating unit 516, and an outputting unit 518. More specifically, the three-dimensional modeling system 500 of the present embodiment has estimated generating units 512L and 512R, as shown in FIG. 16. Moreover, the capturing section 508 also has two capturing units 20L and 20R provided at different positions from each other.

The parallax image storing unit 510, the estimated image generating units 512, the positional difference detecting unit 514, the depth calculating unit 516 and the capturing units 20 respectively have the same functions as those of the parallax image storing unit 302, the estimated image generating unit 303, the positional difference detecting unit 304, the depth calculating unit 308 and the capturing unit 20 in the first embodiment. Moreover, the controller 502 determines times of the image capturing so as to allow the capturing units 20L and 20R to alternately capture images of the subject, and outputs the thus determined image-capturing times to the time setting unit 506. The time setting unit 506 outputs the image-capturing times to the capturing section 508 in accordance with the output of the controller 502. The capturing section 508 makes the capturing units 20L and 20R alternately capture the parallax images of the subject in accordance with the image-capturing times received from the time setting unit 506, and outputs the captured parallax images of the subject to the parallax image storing unit 510.

The parallax image storing unit 510 outputs the parallax images received from the capturing section 508 to the estimated image generating units 512L and 512R and the positional difference detecting unit 514. More specifically, the parallax image storing unit 510 outputs the parallax image captured by the capturing unit 20L to the estimated image generating unit 512L that is associated with the capturing unit 20L, while outputting the parallax image captured by the capturing unit 20R to the estimated image generating unit 512R that is associated with the capturing unit 20R. The estimated image generating units 512L and 512R generate estimated images by using the parallax images shot at different times, respectively, and then output the estimated images thus generated to the positional difference detecting unit 514.

The positional difference detecting unit 514 detects the amount of the positional difference by using the parallax image shot by one of the capturing units 20L and 20R and the estimated image corresponding thereto, that is, the estimated image that is assumed to be viewed from the viewpoint of the other of the capturing units 20L and 20R at the time at which the one of the capturing units 20L and 20R actually captured the image of the subject, in the same manner as that described in the first embodiment. The detected amount of the positional difference is output to the depth calculating unit 516. The depth calculating unit 516 calculates the depth of the subject by using the amount of the positional difference in the same manner as that described in the first embodiment, and then outputs the calculated depth to the outputting unit 518. The outputting unit 518 generates the three-dimensional model of the subject by using the depths received. The outputting unit 518 may output the three-dimensional models in an order in which the parallax images were shot, so as to output a moving image of the subject.

Figure 17:
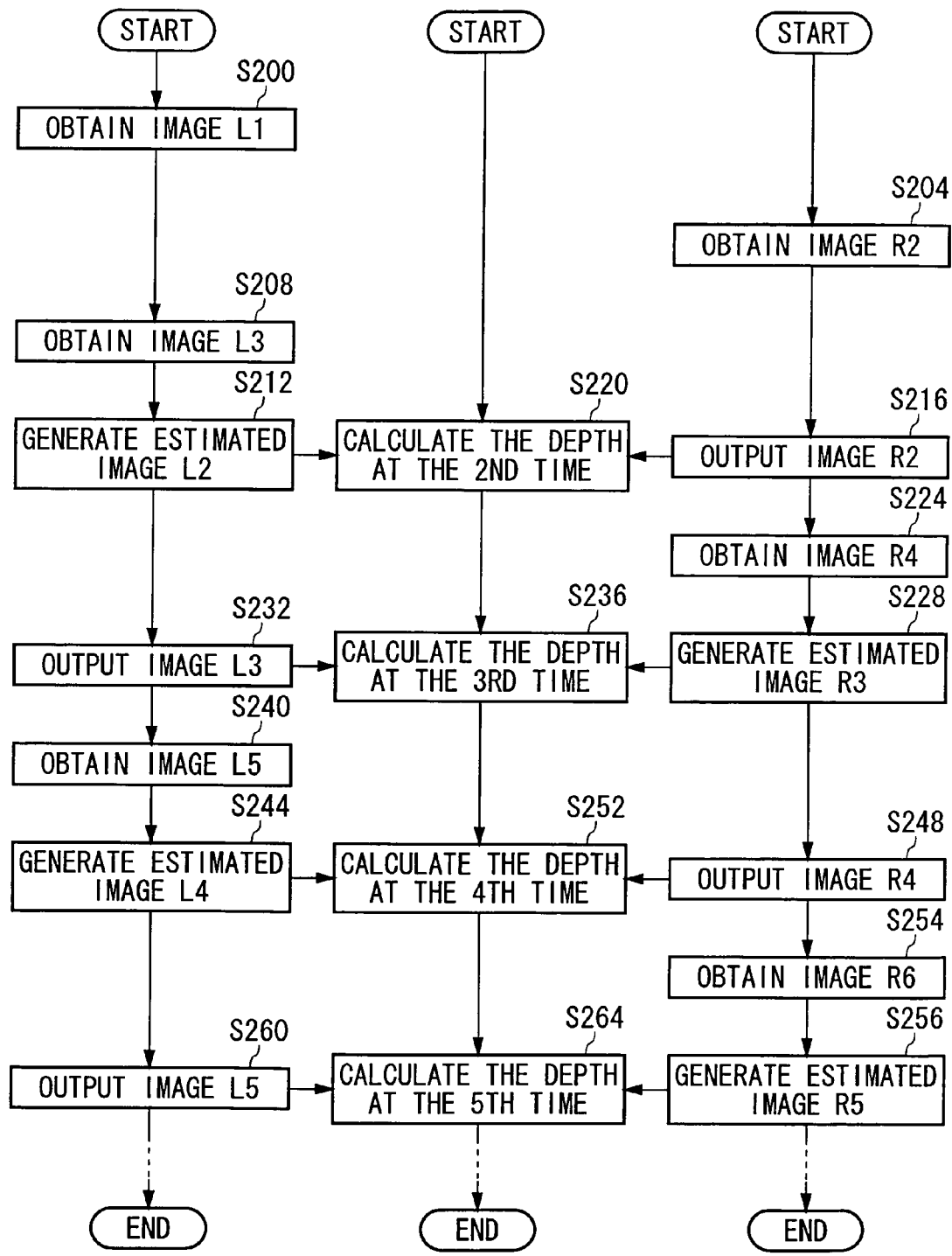
FIG. 17 is a flowchart of an operation by the three-dimensional modeling system shown in FIG. 16.

FIG. 17 is a flowchart of an operation performed by the three-dimensional modeling system 500. The controller 502 cooperates with the time setting unit 506 to instruct the capturing units 20L and 20R to alternately perform the image capturing for the subject with predetermined time intervals. In the present example, the times at which the controller 502 and the time setting unit 506 instruct the image capturing to the capturing units 20L and 20R start with the first time that is followed by the second time, the third time . . . and so on in that order. At the first time, the capturing unit 20L captures the image of the subject. At the second time, the capturing unit 20R captures the image of the subject. In the above-described manner, the image capturing for the subject is performed alternately by the capturing units 20L and 20R. The capturing section 508 obtains an image L1 by the image capturing by the capturing unit 20L at the first time in accordance with the instruction from the controller 502 and the time setting unit 506, and outputs the obtained image L to the parallax image storing unit 510 (Step S200).

Similarly, the capturing section 508 obtains an image R2 by the image capturing by the capturing unit 20R at the second time, and outputs the obtained image R2 to the parallax image storing unit 510 (Step S204). Thereafter, the capturing unit 20L captures an image L3 of the subject at the third time. The image L3 is output to the parallax image storing unit 510 (Step S208). When the parallax image storing unit 510 outputs the images L1 and L3 that were captured by the capturing unit 20L to the estimated image generating unit 512L that is associated with the capturing unit 20L, the estimated image generating unit 512L generates, as an estimated image L2, an image that is assumed to be viewed from the capturing-unit 20L at the second time by estimation using the images L1 and L3. The estimated image L2 is output to the positional difference detecting unit 514 (Step S212). Moreover, when the parallax image storing unit 510 outputs the image R2 to the positional difference detecting unit 514 (Step S216), the positional difference detecting unit 514 detects the amount of the positional difference between the estimated image L2 and the image R2. Then, the depth calculating unit 516 calculates the depth of the subject at the second time by using the detected amount of the positional difference, and outputs the calculated depth to the outputting unit 518 (Step S220).

The capturing unit 20R then captures an image R4 at the fourth time (Step S224). The image R4 is received by the estimated image generating unit 512R associated with the capturing unit 20R via the parallax image storing unit 510. The estimated image generating unit 512R generates an estimated image R3 at the third time by estimation using the images R2 and R4 actually captured, and outputs the estimated image R3 thus generated to the positional difference detecting unit 514 (Step S228). The positional difference detecting unit 514 further receives the image L3 from the parallax image storing unit 510 (Step S232), and then detects the amount of the positional difference between the image L3 and the estimated image R3. The depth calculating unit 516 calculates the depth of the subject at the third time by using the detected amount of the positional difference and outputs the calculated depth to the outputting unit 518 (Step S236).

Next, when the capturing unit 20L captures an image L5 at the fifth time (Step S240), the associated estimated image generating unit 512L generates an estimated image L4 at the fourth time by estimation using the images L3 and L5 received via the parallax image storing unit 510. The estimated image L4 thus generated is output to the positional difference detecting unit 514 (Step S244). The positional difference detecting unit 514 further receives the image R4 from the parallax image storing unit 510 (Step S248), and then detects the amount of the positional difference between the image R4 and the estimated image L4. The depth calculating unit 516 then calculates the depth of the subject at the fourth time by using the amount of the positional difference thus calculated. The calculated depth is output to the outputting unit 518 (Step S252).

Next, when the capturing unit 20R captures an image R6 of the subject at the sixth time (Step S254), the estimated image generating unit 512R associated with the capturing unit 20R generates an estimated image R5 at the fifth image by estimation using the images R4 and R6 received from the capturing unit 20R via the parallax image storing unit 510. The estimated image R5 is output to the positional difference detecting unit 514 (Step S256). The positional difference detecting unit 514 further receives the image L5 from the parallax image storing unit 510 (Step S260), and thereafter detects the amount of the positional difference between the image L5 and the estimated image R5. The depth calculating unit 516 then calculates the depth of the subject at the fifth time by using the amount of the positional difference thus detected, so as to output the calculated depth to the outputting unit 518 (Step S264). For each of the following image-capturing times, the depth of the subject is calculated in a similar manner to that described above. Thus, the outputting unit 518 can generate the three-dimensional model at a desired time.

Moreover, the outputting unit 518 can display the three-dimensional models successively in the order of the image-capturing times so as to display the moving image of the subject. In addition, the three-dimensional modeling system 500 may provide processors to the estimated image generating units 512L and 512R and the positional difference detecting unit 514, respectively. As described above, by alternately capturing the images of the subject at two difference viewpoints and using three of the images, which were shot at successive times, the time lag from the image capturing to the finish of the depth calculation can be minimized. Also, the depth calculation for the subject can be efficiently performed.

As described above, according to the image capturing apparatus and the image processing apparatus of the present invention, even if the subject is moving, a pair of parallax images from which the positional difference caused by the move of the subject is removed can be estimated from a plurality of images of the subject that were captured at two or more different viewpoints so as to include two or more images captured at the same viewpoint. Thus, the positional difference of an image of a particular region of the subject can be detected. Accordingly, the depth of the subject can be obtained by using the obtained positional difference.

Although the present invention has been described by way of exemplary embodiments, it should be understood that those skilled in the art might make many changes and substitutions without departing from the spirit and the scope of the present invention which is defined only by the appended claims.

What is claimed is:

1. An image capturing apparatus for obtaining information regarding a depth of a subject, comprising:
    a single capturing section including a single lens section and a single shutter operable to perform image capturing for said subject at a plurality of viewpoints;
    a controller operable to control said single capturing section to perform said image capturing at different timings at said plurality of viewpoints by controlling a movement of said lens section from a first position to at least a second position within the single capturing section, wherein said controller controls said single capturing section to perform said image capturing for said subject two or more times at at least one of said plurality of viewpoints;
    a positional difference detecting unit operable to detect a positional difference of an image of a particular region of said subject based on two or more images obtained at said one viewpoint and another image obtained at another viewpoint, wherein a depth calculating unit calculates a depth of said particular region of said subject based on said positional difference; and
    an estimated image generating unit operable to generate an estimated image of said particular region of said subject that is assumed to be captured at one viewpoint at the same time as a time at which another image was captured at another viewpoint, by estimation based on said two or more images obtained at said one viewpoint, wherein said positional difference detecting unit detects a difference of a position of an image of said particular region of said subject between said estimated image and said another image obtained at said another viewpoint.

2. An image capturing apparatus as claimed in claim 1, further comprising a viewpoint moving unit operable to move a position at which said capturing section performs said image capturing for said subject to said plurality of viewpoints, wherein
    said controller controls said capturing section to perform said image capturing for said subject at said plurality of viewpoints successively by moving said position to said plurality of viewpoints, thereby allowing said image capturing to be performed at said at least one viewpoint two or more times.

3. An image capturing apparatus as claimed in claim 2, wherein said single capturing section includes a light converging unit operable to converge light incident thereon and a light-limiting unit having at least one aperture for limiting a range where said light is allowed to pass, and
    said viewpoint moving unit moves said aperture by moving said light-limiting unit, to realize said plurality of viewpoints.

4. An image capturing apparatus as claimed in claim 3, wherein said single capturing section includes a light converging unit operable to converge light incident thereon and a light-limiting unit having a plurality of apertures for limiting a range where said light is allowed to pass, and
   said viewpoint moving unit closes at least one of said plurality of apertures to realize said plurality of viewpoints.

5. An image capturing apparatus as claimed in claim 2, wherein said viewpoint moving unit is capable of moving said capturing section at three or more viewpoints which are not aligned on one line.

6. An image capturing apparatus as claimed in claim 5, wherein said viewpoint moving unit is capable of moving said capturing section to five positions including apices and a center of a diamond.

7. An image capturing apparatus as claimed in claim 1, wherein said single capturing section performs said image capturing for said subject at two of said plurality of viewpoints, and
   said controller controls said capturing section to alternately perform said image capturing at said two viewpoints three or more times.

8. An image capturing apparatus for obtaining information regarding a depth of a subject, comprising:
   a single capturing section including a single lens section and a single shutter operable to perform image capturing for said subject at a plurality of viewpoints;
   a controller operable to control said single capturing section to perform said image capturing at different timings at said plurality of viewpoints by controlling a movement of said lens section from a first position to at least a second position within the single capturing section, wherein
   said controller controls said single capturing section to perform said image capturing for said subject two or more times at at least one of said plurality of viewpoints;
   a depth calculating unit operable to calculate a depth of a particular region of said subject in relation to said single capturing section based on two or more images obtained by said image capturing performed for said subject two or more times at said one viewpoint and another image obtained by said image capturing performed at another viewpoint different from said one viewpoint;
   a positional difference detecting unit operable to detect a positional difference of an image of said particular region of said subject based on said two or more images obtained at said one viewpoint and said another image obtained at said another viewpoint, wherein said depth calculating unit calculates said depth of said particular region of said subject based on said positional difference: and
   an estimated image generating unit operable to generate an estimated image of said particular region of said subject that is assumed to be captured at said one viewpoint at the same time as a time at which said another image was captured at said another viewpoint, by estimation based on said two or more images obtained at said one viewpoint, wherein said positional difference detecting unit detects a difference of a position of an image of said particular region of said subject between said estimated image and said another image obtained at said another viewpoint.

9. An Image capturing apparatus as claimed in claims 1 or 8, further comprising a time setting unit operable to set a time of said image capturing by said capturing section, wherein
   said estimated image generating unit estimates said position of said image of said particular region of said subject at a predetermined time at said one viewpoint, based on respective times at which said image capturing was performed two or more times at said one viewpoint and said position of said image of said particular region in said two ore more images obtained at said one viewpoint.

10. An image processing apparatus for obtaining information regarding a depth of a subject, comprising:
    an inputting unit operable to input a plurality of images of said subject successively shot at a plurality of different viewpoints, said plurality of images including two or more images shot at one viewpoint;
    an estimated image generating unit operable to generate an estimated image that is assumed to be shot at said one viewpoint at a time the same as a time at which another one of said plurality of images was shot at another viewpoint different from said one viewpoint, by estimation based on said two or more images shot at said one viewpoint;
    a positional difference detecting unit operable to detect a difference of a position of an image of a particular region of said subject between said estimated image and said another image shot at said another viewpoint; and
    a depth calculating unit operable to calculate a depth of said particular region of said subject based on said difference of said position.

11. An image processing apparatus as claimed in claim 10, wherein said estimated image generating unit estimates said position of said image of said particular region of said subject when said subject is seen from said one viewpoint at the same time as said time at which said another image was captured at said another viewpoint, based on respective times at which said two or more images were shot at said one viewpoint and said position of said image of said particular region in said two or more images shot at said one viewpoint.

12. An image processing apparatus as claimed in claim 10, wherein said estimated image generating unit estimates said position of said image of said particular region of said subject when said subject is seen from said another viewpoint at the same time as said time at which said another image was captured at said another viewpoint, based on said position and a size of said image of said particular region in each of said two or more images shot at said one viewpoint.

13. An image processing apparatus as claimed in claim 10, wherein said estimated image generating unit separates a first region including a change of a position or size of an image of said subject between said two or more images shot at said one viewpoint from a second region including no change of said position or size of said image of said subject, and uses one of said two or more images shot at said one viewpoint as said estimated image in a case of generating an estimated image for said second region.

14. An image processing apparatus as claimed in claim 10, wherein said inputting unit alternately inputs a plurality of images shot at two of said plurality of viewpoints, said two viewpoints being different from each other,
    said estimated image generating unit performs a first estimation using a first image shot at one of said two viewpoints and a second image shot at said one of said two viewpoints prior to said first image, and then performs a second estimation using a third image shot at said one of said two viewpoints after said first image and said first image, and said positional difference detecting unit detects a positional difference between said first and second estimations by using said first image and a further image shot at the other of said two viewpoints.

15. An image capturing method for obtaining information regarding a depth of a subject, comprising:

capturing a first image of said subject at a first time at a first viewpoint;

capturing a second image of said subject at a second time at a second viewpoint;

capturing a third image of said subject at a third time at said first viewpoint;

estimating an image of a particular region of said subject at said second time at said first viewpoint based on said first and third images;

detecting a positional difference between said estimated image of said particular region of said subject and an image of said particular region of said subject in said second image; and calculating a depth of said particular region of said subject based on said detected positional difference.

16. A recording medium storing a computer program for obtaining information regarding a depth of a subject, said program comprising:

an inputting module operable to input a plurality of images of said subject successively shot at a plurality of different viewpoints, said plurality of images including two or more images shot at one viewpoint;

an estimated image generating module operable to generate an estimated image that is assumed to be shot at said one viewpoint at the same time as a time at which another one of said plurality of images was shot at another viewpoint different from said one viewpoint, by estimation based on said two or more images shot at said one viewpoint;

a positional difference detecting module operable to detect a difference of a position of an image of a particular region of said subject between said estimated image and said another image shot at said another viewpoint; and a depth calculating module operable to calculate a depth of said particular region of said subject based on said difference of said position.

* * * * *